US012574793B2

(12) United States Patent
Lyazidi et al.

(10) Patent No.: US 12,574,793 B2
(45) Date of Patent: Mar. 10, 2026

(54) FIRST NETWORK NODE, SECOND NETWORK NODE AND METHODS IN A WIRELESS COMMUNICATIONS NETWORK

(71) Applicant: Telefonaktiebolaget LM Ericsson (publ), Stockholm (SE)

(72) Inventors: Yazid Lyazidi, Hässelby (SE); Liwei Qiu, Täby (SE); Nianshan Shi, Järfälla (SE); Alexander Vesely, Feldbach (AT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 345 days.

(21) Appl. No.: 18/031,667

(22) PCT Filed: Oct. 20, 2021

(86) PCT No.: PCT/SE2021/051037
§ 371 (c)(1),
(2) Date: Apr. 13, 2023

(87) PCT Pub. No.: WO2022/086408
PCT Pub. Date: Apr. 28, 2022

(65) Prior Publication Data
US 2023/0388848 A1 Nov. 30, 2023

(30) Foreign Application Priority Data
Oct. 22, 2020 (WO) ................ PCT/CN2020/122642

(51) Int. Cl.
*H04W 28/02* (2009.01)
*H04W 28/086* (2023.01)
*H04W 28/24* (2009.01)

(52) U.S. Cl.
CPC ... *H04W 28/0268* (2013.01); *H04W 28/0865* (2023.05); *H04W 28/24* (2013.01)

(58) Field of Classification Search
CPC ......... H04W 28/0268; H04W 28/0865; H04W 28/24; H04W 28/0967; H04W 28/12;
(Continued)

(56) References Cited

U.S. PATENT DOCUMENTS

| | | | |
|---|---|---|---|
| 10,129,766 B2 | 11/2018 | Chen et al. | |
| 11,224,082 B2 * | 1/2022 | Tsai ...................... | H04W 76/15 |

(Continued)

FOREIGN PATENT DOCUMENTS

| | | | |
|---|---|---|---|
| EP | 3101940 A1 | 12/2016 | |
| EP | 3603317 A1 | 2/2020 | |

(Continued)

OTHER PUBLICATIONS

ETSI TS 138 423 V15.3.0; 5G; NG-RAN; Xn Application Protocol (XnAP) (3GPP TS 38.423 version 15.3.0 Release 15) (Year: 2019).*

(Continued)

*Primary Examiner* — Andrew W Chriss
(74) *Attorney, Agent, or Firm* — COATS & BENNETT, PLLC

(57) ABSTRACT

A method performed by a first network node for handling Quality of Service, QoS, parameters for respective first and second radio resources to be provided to a User Equipment, UE, in Multi Radio access technology—Dual Connectivity. The first network node sends (502) a first indication to the second network node. The first indication indicates a first set of downgraded QoS levels and their respective one or more QoS parameters currently supported in the first network node. The first network node receives (503) a second indication from the second network node. The second indication indicates the second set of downgraded QoS levels and their respective one or more QoS parameters currently supported in the second network node. The first network node decides (504) one or more QoS parameters for the first radio (Continued)

resources to be provided to the UE from the first network node in the MR-DC.

24 Claims, 13 Drawing Sheets

(58) Field of Classification Search
    CPC . H04W 92/20; H04W 72/543; H04W 52/265;
                        H04W 36/30; H04W 36/304
    See application file for complete search history.

(56)                    References Cited

U.S. PATENT DOCUMENTS

| | | | | |
|---|---|---|---|---|
| 2018/0115927 | A1 | 4/2018 | Vesterinen et al. | |
| 2019/0182902 | A1* | 6/2019 | Han | H04W 76/11 |
| 2020/0059333 | A1* | 2/2020 | Paladugu | H04W 76/16 |
| 2020/0280872 | A1 | 9/2020 | Fiorani et al. | |
| 2021/0120450 | A1* | 4/2021 | Peng | H04W 28/22 |
| 2022/0038941 | A1* | 2/2022 | Han | H04W 28/0268 |

FOREIGN PATENT DOCUMENTS

| | | | | |
|---|---|---|---|---|
| EP | 3606162 | A1 | 2/2020 | |
| WO | 2018174683 | A1 | 9/2018 | |
| WO | 2018230982 | A1 | 12/2018 | |
| WO | WO-2019098912 | A1 * | 5/2019 | ........ H04W 28/0205 |
| WO | WO-2019193553 | A1 * | 10/2019 | ........ H04W 28/0252 |
| WO | WO-2020068952 | A1 * | 4/2020 | ........... H04W 76/12 |

OTHER PUBLICATIONS

3GPP TS 37.340 V16.1.0, 3rd Generation Partnership Project; Technical Specification Group Radio Access Network; Evolved Universal Terrestrial Radio Access (E-UTRA) and NR; Multi-connectivity; Stage 2 (Release 16) (Year: 2020).*

Samsung, "Clarification regarding QoS handling in MRDC with 5G CN", Change Request, 3GPP TSG-RAN WG2 #108, Nov. 14-18, 2019, pp. 1-4, R2-1915709, 3GPP, Reno, USA.

Ericsson, "Managament of GBR QoS Flows at handover", Change Request, SA WG2 Meeting #S2-136, Nov. 18-22, 2019, pp. 1-4, S2-1911249, 3GPP, Reno, USA.

Huawei, "End marker handling in case of MR-DC NG-RAN initiated QoS Flow offloading", Change Request, 3GPP TSG-RAN WG3 #110-e, Nov. 2-12, 2020, pp. 1-6, R3-206123, 3GPP.

3rd Generation Partnerhship Project, "3rd Generation Partnership Project; Technical Specification Group Radio Access Network; Evolved Universal Terrestrial Radio Access Network (E-UTRAN); Extension of Dual Connectivity in EUTRAN (Release 13)", Technical Report, 3GPP TR 36.875 V1.2.0, May 2015, pp. 1-38, 3GPP.

3rd Generation Partnerhship Project, "3rd Generation Partnership Project; Technical Specification Group Radio Access Network; Evolved Universal Terrestrial Radio Access (E-UTRA) and NR; Multi-connectivity: Stage 2 (Release 16)", Technical Specification, 3GPP TS 37.340 V16.3.0, Sep. 2020, pp. 1-83, 3GPP.

3rd Generation Partnerhship Project, "3rd Generation Partnership Project; Technical Specification Group Services and System Aspects; Policy and charging control framework for the 5G System (5GS); Stage 2 (Release 16)", Technical Specification, 3GPP TS 23.503 V16.6.0, Sep. 2020, pp. 1-118, 3GPP.

3rd Generation Partnerhship Project, "3rd Generation Partnership Project; Technical Specification Group Services and System Aspects; Procedures for the 5G System (5GS); Stage 2 (Release 16)", Technical Specification, 3GPP TS 23.502 V16.6.0, Sep. 2020, pp. 1-597, 3GPP.

3rd Generation Partnerhship Project, "3rd Generation Partnership Project; Technical Specification Group Radio Access Network; NG-RAN; Xn application protocol (XnAP) (Release 16)", Technical Specification, 3GPP TS 38.423 V16.3.0, Sep. 2020, pp. 1-451, 3GPP.

3rd Generation Partnerhship Project, "3rd Generation Partnership Project; Technical Specification Group Services and System Aspects; System architecture for the 5G System (5GS); Stage 2 (Release 16)", Technical Specification, 3GPP TS 23.501 V16.6.0, Sep. 2020, pp. 1-447, 3GPP.

* cited by examiner

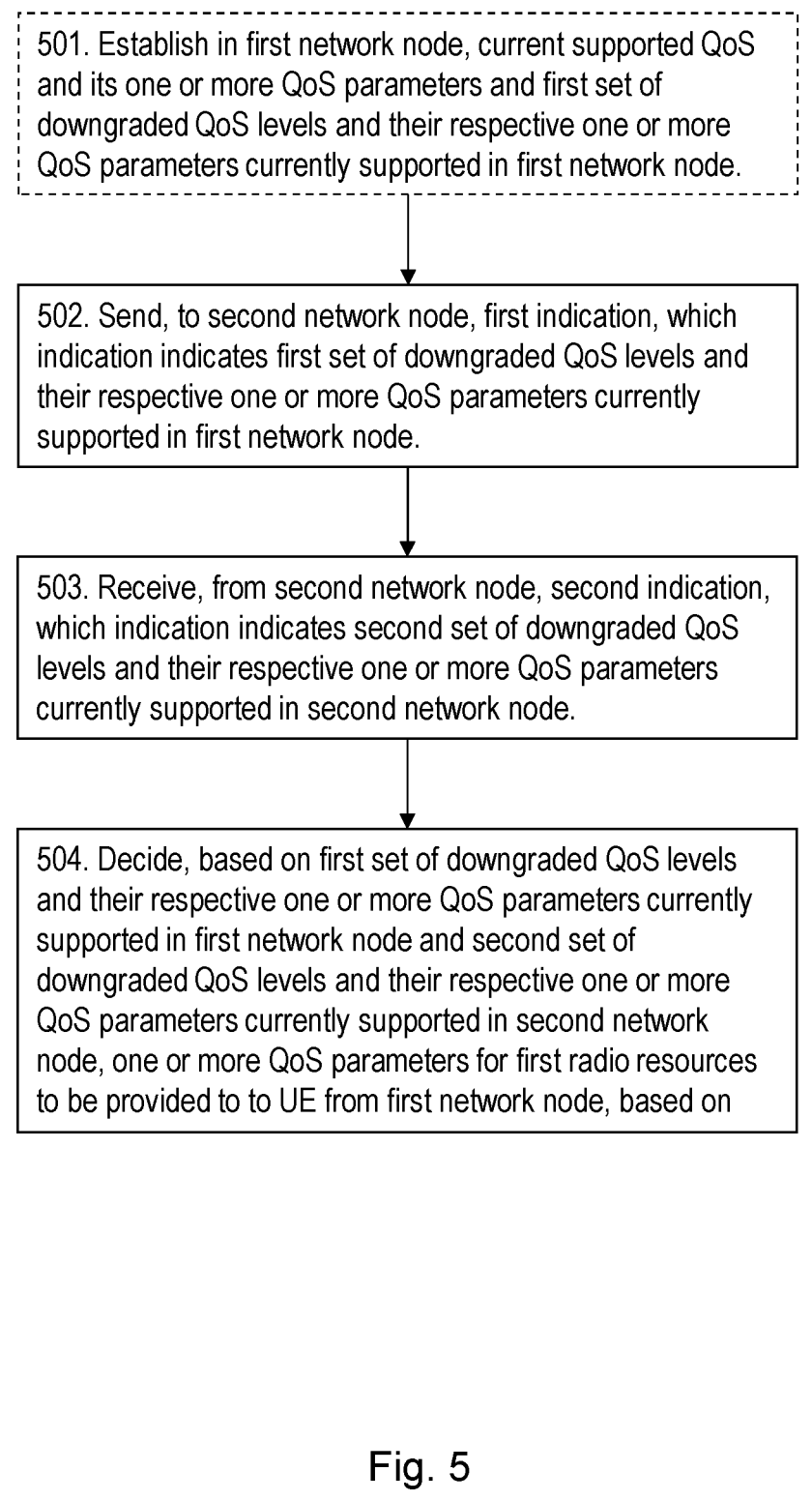

501. Establish in first network node, current supported QoS and its one or more QoS parameters and first set of downgraded QoS levels and their respective one or more QoS parameters currently supported in first network node.

502. Send, to second network node, first indication, which indication indicates first set of downgraded QoS levels and their respective one or more QoS parameters currently supported in first network node.

503. Receive, from second network node, second indication, which indication indicates second set of downgraded QoS levels and their respective one or more QoS parameters currently supported in second network node.

504. Decide, based on first set of downgraded QoS levels and their respective one or more QoS parameters currently supported in first network node and second set of downgraded QoS levels and their respective one or more QoS parameters currently supported in second network node, one or more QoS parameters for first radio resources to be provided to to UE from first network node, based on

Fig. 5

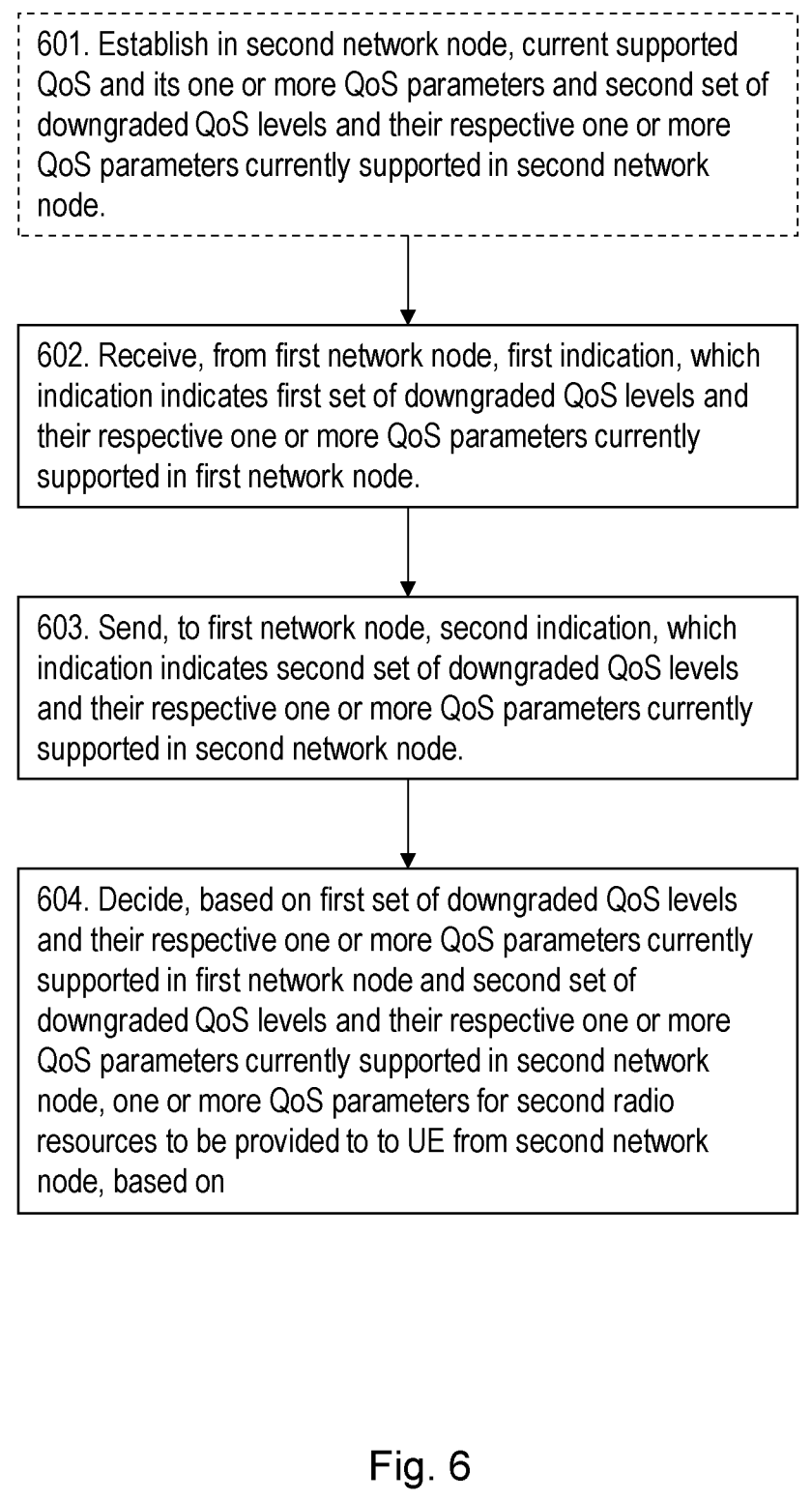

601. Establish in second network node, current supported QoS and its one or more QoS parameters and second set of downgraded QoS levels and their respective one or more QoS parameters currently supported in second network node.

602. Receive, from first network node, first indication, which indication indicates first set of downgraded QoS levels and their respective one or more QoS parameters currently supported in first network node.

603. Send, to first network node, second indication, which indication indicates second set of downgraded QoS levels and their respective one or more QoS parameters currently supported in second network node.

604. Decide, based on first set of downgraded QoS levels and their respective one or more QoS parameters currently supported in first network node and second set of downgraded QoS levels and their respective one or more QoS parameters currently supported in second network node, one or more QoS parameters for second radio resources to be provided to to UE from second network node, based on

Fig. 6

Computer program 770

Carrier 780

Memory 760

Processor 750

Input/Output Interface 700

First network node 111

Establishing Unit 710

Sending Unit 720

Receiving Unit 730

Deciding Unit 740

First network node 111

Computer program 870

Carrier 880

FIRST NETWORK NODE, SECOND NETWORK NODE AND METHODS IN A WIRELESS COMMUNICATIONS NETWORK

TECHNICAL FIELD

Embodiments herein relate to a first and a second network node and methods therein. In some aspects, they relate to handling one or more Quality of Service (QoS) parameters for respective first and second radio resources to be provided to a User Equipment (UE) in Multi Radio access technology—Dual Connectivity (MR-DC).

BACKGROUND

In a typical wireless communication network, wireless devices, also known as wireless communication devices, mobile stations, stations (STA) and/or User Equipment (UE), communicate via a Local Area Network such as a W-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a W-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

Alternative QoS Profiles may optionally be provided for a Guaranteed Bit Rate (GBR) QoS flow with Notification control enabled. If a corresponding Policy and Charging Control (PCC) rule contains the related information, the Session Management Function (SMF) shall provide, in addition to the QoS profile, a prioritized list of Alternative QoS Profiles to the Next Generation Radio Access Network (NG-RAN). If the SMF provides a new prioritized list of Alternative QoS Profiles to the NG-RAN, if the corresponding PCC rule information changes, the NG-RAN shall replace any previously stored list with it.

An Alternative QoS Profile represents a combination of QoS parameters Packet Delay Budget (PDB), Packet Error Rate (PER) and Guaranteed Flow Bit Rate (GFBR) to which the application traffic is able to adapt.

There is no requirement that the GFBR monotonically decreases, nor that the PDB or PER monotonically increase as the Alternative QoS Profiles become less preferred.

When the NG-RAN sends a notification to the SMF that the QoS profile is not fulfilled, the NG-RAN shall, if the currently fulfilled values match an Alternative QoS Profile, include also the reference to the Alternative QoS Profile to indicate the QoS that the NG-RAN currently fulfils. The NG-RAN shall enable the SMF to determine when an NG-RAN node supports the Alternative QoS feature but cannot fulfil even the least preferred Alternative QoS Profile.

Support of Alternative QoS Profile in Notification Control

If, for a given GBR QoS Flow, Notification control is enabled and the NG-RAN has received a list of Alternative QoS Profiles for this QoS Flow and supports the Alternative QoS Profile handling, the following shall apply:

1) If the NG-RAN determines that the GFBR, the PDB or the PER of the QoS profile cannot be fulfilled, NG-RAN shall send a notification towards SMF that the "GFBR can no longer be guaranteed". Before sending a notification that the "GFBR can no longer be guaranteed" towards the SMF, the NG-RAN shall check whether the GFBR, the PDB and the PER that the NG-RAN currently fulfils match any of the Alternative QoS Profiles in the indicated priority order. If there is a match, the NG-RAN shall indicate the reference to the matching Alternative QoS Profile with the highest priority together with the notification to the SMF. If there is no match, the NG-RAN shall send a notification that the "GFBR can no longer be guaranteed" towards the SMF without referencing any of the Alternative QoS Profiles, unless specific conditions at the NG-RAN require the release of the NG-RAN resources for this GBR QoS Flow, e.g. due to Radio link failure or RAN internal congestion.

2) If a notification that the "GFBR can no longer be guaranteed" has been sent to the SMF and the NG-RAN determines that the currently fulfilled GFBR, PDB or PER are different, better or worse, from the situation indicated in the last notification, the NG-RAN shall send a further notification to the SMF and indicate the currently fulfilled situation.

The fulfilled situation is either the QoS Profile, an Alternative QoS Profile, or an indication that the lowest priority Alternative QoS Profile cannot be fulfilled.

3) The NG-RAN should always try to fulfil the QoS profile and any Alternative QoS Profile that has higher priority than the currently fulfilled situation.

In order to avoid a too frequent signaling to the SMF, it is assumed that NG-RAN implementation can apply hysteresis, e.g., via a configurable time interval, before notifying the SMF that the currently fulfilled values match the QoS Profile or a different Alternative QoS Profile of higher priority. It is also assumed that the Policy Control Function (PCF) has ensured that the QoS values within the different Alternative QoS Profiles are not too close to each other.

4) Upon receiving a notification from the NG-RAN, the SMF may inform the PCF. If it does so, the SMF shall indicate the currently fulfilled situation to the PCF.

5) If the PCF has not indicated differently, the SMF uses Non-access Stratum (NAS) signaling, that is sent transparently through the RAN, to inform the UE about changes in the QoS parameters that the NG-RAN is currently fulfilling for the QoS Flow after Notification control has occurred.

Support of Alternative QoS Profile at Handover

During handover, the prioritized list of Alternative QoS Profiles, if available, is provided to the target NG-RAN per QoS Flow in addition to the QoS profile. If the target NG-RAN is not able to guarantee the GFBR, the PDB and the PER included in the QoS profile and if Alternative QoS Profiles are provided to the target NG-RAN and the target NG-RAN supports Alternative QoS Profiles, the target NG-RAN checks whether the GFBR, the PDB and the PER values that it can fulfil match any of the Alternative QoS Profiles taking the priority order into account. If there is a match between one of the Alternative QoS Profiles and the GFBR, the PDB and the PER values that target NG-RAN can fulfil, the target NG-RAN shall accept the QoS Flow and indicate the reference to that Alternative QoS Profile to the source NG-RAN.

If there is no match to any Alternative QoS Profile, the target NG-RAN rejects QoS Flows for which the target NG-RAN is not able to guarantee the GFBR, the PDB and the PER included in the QoS profile.

After the handover is completed and a QoS Flow has been accepted by the target NG-RAN based on an Alternative QoS Profile, the target NG-RAN shall treat this QoS Flow in the same way as if it had sent a notification that the "GFBR can no longer be guaranteed" with a reference to that Alternative QoS Profile to the SMF.

If a QoS Flow has been accepted by the target NG-RAN based on an Alternative QoS Profile, the reference to the matching Alternative QoS Profile is provided from the target NG-RAN to the Access and Mobility Function (AMF), which forwards the message to the SMF, during the Xn and N2 based handover procedures. Xn when used e.g. means the network interface between NG-RAN nodes, as defined in 3GPP Technical Specification (TS) 38.423. N2 when used e.g. means the NG-C interface between NG-RAN and 5GC as defined in 3GPP TS 38.413.

After the handover is completed successfully, the SMF shall send a notification to the PCF that the "GFBR can no longer be guaranteed" for a QoS Flow if the SMF has received a reference to an Alternative QoS Profile and this reference indicates a change in the previously notified state of this QoS Flow. If the PCF has not indicated differently, the SMF shall also use NAS signaling, that is sent transparently through the RAN, to inform the UE about the QoS parameters corresponding to the new state of the QoS Flow.

Multi-Connectivity Operations

Secondary Node Addition

A Secondary Node (SN) Addition procedure is initiated by a Master Node (MN) and is used to establish a UE context at the SN in order to provide resources from the SN to the UE. For bearers requiring Secondary Cell Group (SCG) radio resources, this procedure is used to add at least the initial SCG serving cell of the SCG. This procedure can also be used to configure an SN terminated Master Cell Group (MCG) bearer, where no SCG configuration is needed. FIG. 1 shows 3GPP FIG. 10.2.2-1, SN Addition procedure according to described below.

1. The MN decides to request the target SN to allocate resources for one or more specific PDU Sessions/QoS Flows, indicating QoS Flows characteristics, e.g. QoS Flow Level QoS parameters, Protocol Data Unit (PDU) session level Transport Network Layer (TNL) address information, and PDU session level Network Slice info. In addition, for bearers requiring SCG radio resources, MN indicates the requested SCG configuration information, including the entire UE capabilities and the UE capability coordination result. In this case, the MN also provides the latest measurement results for SN to choose and configure the SCG cells. The MN may request the SN to allocate radio resources for split Signaling Radio Bearer (SRB) operation. In NG-RAN E-UTRA-NR Dual Connectivity (NGEN-DC) and NR-DC, the MN always provides all the needed security information to the SN, even if no SN terminated bearers are setup, to enable SRB3 to be setup based on SN decision.

For MN terminated bearer options that require Xn-U resources between the MN and the SN, the MN provides Xn-U Uplink (UL) TNL address information. For SN terminated bearers, the MN provides a list of available Data Radio Bearer (DRB) Identities (IDs). The Secondary NG-RAN (S-NG-RAN) node shall store this information and use it when establishing SN terminated bearers. The SN may reject the request.

For SN terminated bearer options that require Xn-U resources between the MN and the SN, the MN provides in step 1 a list of QoS flows per PDU Sessions for which SCG resources are requested to be setup upon which the SN decides how to map QoS flows to DRB.

For split bearers, MCG and SCG resources may be requested of such an amount, that the QoS for the respective QoS Flow is guaranteed by the exact sum of resources provided by the MCG and the SCG together, or even more. For MN terminated split bearers, the MN decision is reflected in step 1 by the QoS Flow parameters signaled to the SN, which may differ from QoS Flow parameters received over NG.

For a specific QoS flow, the MN may request the direct establishment of SCG and/or split bearers, i.e. without first having to establish MCG bearers. It is also allowed that all QoS flows can be mapped to SN terminated bearers, i.e. there is no QoS flow mapped to an MN terminated bearer.

2. If the Radio Resource Management (RRM) entity in the SN is able to admit the resource request, it allocates respective radio resources and, dependent on the bearer type options, respective transport network resources. For bearers requiring SCG radio resources the SN triggers UE Random Access so that synchronization of the SN radio resource configuration can be performed. The SN decides for the Primary Secondary Cell (PSCell) and other SCG Secondary Cells (SCell) and provides the new SCG radio resource configuration to the MN within an SN Radio Resource Configuration (RRC) configuration message contained in the SN Addition Request Acknowledge message. In case of bearer options that require Xn-U resources between the MN and the SN, the SN provides Xn-U TNL address information for the respective DRB, Xn-U UL TNL address information for SN terminated bearers, Xn-U DL TNL address information for MN terminated bearers. For SN terminated bearers, the SN provides the NG-U DL TNL address information for the respective PDU Session and security algorithm. If SCG radio resources have been requested, the SCG radio resource configuration is provided.

In case of MN terminated bearers, transmission of user plane data may take place after step 2.

In case of SN terminated bearers, data forwarding, and the SN Status Transfer may take place after step 2.

Secondary Node Modification (MN/SN initiated) The SN Modification procedure may be initiated either by the MN or by the SN and be used to modify the current user plane resource configuration, e.g. related to PDU session, QoS flow or DRB, or to modify other properties of the UE context within the same SN. It may also be used to transfer an RRC message from the SN to the UE via the MN and the response from the UE via MN to the SN, e.g. when SRB3 is not used. In NGEN-DC and NR-DC, the RRC message is an NR message, e.g. RRCReconfiguration, whereas in NR-E-UTRA Dual Connectivity (NE-DC) it is an E-UTRA message, e.g. RRCConnectionReconfiguration.

The SN modification procedure does not necessarily need to involve signaling towards the UE.

MN Initiated SN Modification

The MN uses the procedure to initiate configuration changes of the SCG within the same SN, including addition, modification or release of the user plane resource configuration. The MN uses this procedure to perform handover within the same MN while keeping the SN, when the SN needs to be involved, i.e. in NGEN-DC. The MN also uses the procedure to query the current SCG configuration, e.g. when delta configuration is applied in an MN initiated SN change. The MN also uses the procedure to provide the S-RLF related information to the SN or to provide additional available DRB IDs to be used for SN terminated bearers. The MN may not use the procedure to initiate the addition, modification or release of SCG SCells. The SN may reject the request, except if it concerns the release of the user plane resource configuration, or if it is used to perform handover within the same MN while keeping the SN. FIG. 2 shows 3GPP Figure an example signaling flow for an MN initiated SN Modification procedure described below.

1. The MN sends the SN Modification Request message, which may contain user plane resource configuration related or other UE context related information, data forwarding address information if applicable, PDU session level Network Slice info and the requested SCG configuration information, including the UE capabilities coordination result to be used as basis for the reconfiguration by the SN. In case a security key update in the SN is required, a new SN Security Key is included.

2. The SN responds with the SN Modification Request Acknowledge message, which may contain new SCG radio configuration information within an SN RRC reconfiguration message, and data forwarding address information if applicable.

Inter-Master Node Handover with and/or without Secondary Node Change

Inter-MN handover with and/or without MN initiated SN change is used to transfer UE context data from a source MN to a target MN while the UE context at the SN is kept or moved to another SN. During an Inter-Master Node handover, the target MN decides whether to keep or change the SN, or release the SN, as described in Only intra-RAT Inter-Master node handover with/without SN change is supported, e.g. no transition from NGEN-DC to NR-DC.

FIGS. 3a and b show 3GPP FIG. 10.7.2-1, which is an example of signaling flow for inter-MN handover with or without MN initiated SN change described below.

For an Inter-Master Node handover without Secondary Node change, the source SN and the target SN shown in FIG. 3 are the same node.

1. The source MN starts the handover procedure by initiating the Xn Handover Preparation procedure including both MCG and SCG configuration. The source MN includes the source SN UE XnAP ID, SN ID and the UE context in the source SN in the Handover Request message.

The source MN may send the SN Modification Request message, to the source SN, to request the current SCG configuration and allow provision of data forwarding related information before step 1.

2. If the target MN decides to keep the source SN, the target MN sends SN Addition Request to the SN including the SN UE XnAP ID as a reference to the UE context in the SN that was established by the source MN. If the target MN decides to change the SN, the target MN sends the SN Addition Request to the (target) SN including the UE context in the source SN that was established by the source MN.

3. The target SN replies with SN Addition Request Acknowledge. The target SN may include the indication of the full or delta RRC configuration.

4. The target MN includes within the Handover Request Acknowledge message the MN RRC reconfiguration message to be sent to the UE in order to perform the handover, and may also provide forwarding addresses to the source MN. If PDU session split is performed in the target MN node during handover procedure, more than one data forwarding addresses corresponding to each node should be included in Handover Request Acknowledge message. The target MN indicates to the source MN that the UE context in the SN is kept if the target MN and the SN decided to keep the UE context in the SN in step 2 and step 3.

5a/5b. The source MN sends SN Release Request message to the source SN including a Cause indicating MCG mobility. The source SN acknowledges the release request. The source MN indicates to the source SN that the UE context in SN is kept, if it receives the indication from the target MN. If the indication as the UE context kept in SN is included, the SN keeps the UE context.

In Multi Radio—Dual Connectivity (MR-DC), transmissions may be handled by the MN or SN. If a QoS flow is degraded to an alternative QoS profile, radio resources need to be handled accordingly. If not handled correctly, the degraded QoS flow will be dropped which may result in loss of radio resources in a UE and a decreased performance in the network.

SUMMARY

As a part of developing embodiments herein the inventors identified a problem which first will be discussed.

A problem is that currently it is not clear how to handle QoS and QoS parameters for radio resources in MR-DC, when degraded to alternative QoS profile or parameters, e.g. downgraded QoS levels and their respective QoS parameters. This is since there is no way to coordinate and exchange this between a Master Node (MN) and Secondary Node (SN) outside of the Notification Control Indication. This may result in that the MN is not capable of providing an optimal configuration for radio resources when QoS has been degraded to downgraded QoS levels, or when the MN or SN has been changed.

An object of embodiments herein is to provide an improved performance in a wireless communications network using QoS in MR-DC.

According to an aspect of embodiments herein, the object is achieved by a method performed by a first network node for handling one or more Quality of Service, QoS, parameters for respective first and second radio resources to be provided to a User Equipment, UE, in Multi Radio access technology—Dual Connectivity, MR-DC. The first network node operates in the MR-DC with a second network node in a wireless communications network.

The first network node sends a first indication to the second network node. The first indication indicates a first set of downgraded QoS levels and their respective one or more QoS parameters currently supported in the first network node. This enables the second network node to decide one or more QoS parameters for the second radio resources to be provided to the UE from the second network node in the MR-DC. The deciding is based on the first set of downgraded QoS levels and their respective one or more QoS parameters currently supported in the first network node and a second set of downgraded QoS levels and their respective one or more QoS parameters currently supported in the second network node.

The first network node receives a second indication from the second network node. The second indication indicates the second set of downgraded QoS levels and their respective one or more QoS parameters currently supported in the second network node.

The first network node decides one or more QoS parameters for the first radio resources to be provided to the UE from the first network node in the MR-DC. The deciding is based on the first set of downgraded QoS levels and their respective one or more QoS parameters currently supported in the first network node and the second set of downgraded QoS levels and their respective one or more QoS parameters currently supported in the second network node.

According to an aspect of embodiments herein, the object is achieved by a method performed by a second network node for handling one or more Quality of Service, QoS, parameters for respective first and second radio resources to be provided to a User Equipment, UE, in Multi Radio access technology—Dual Connectivity, MR-DC. The second network node operates in the MR-DC with a first network node in a wireless communications network.

The second network node receives a first indication from the first network node. The first indication indicates a first set of downgraded QoS levels and their respective one or more QoS parameters currently supported in the first network node.

The second network node sends a second indication to the first network node. The second indication indicates a second set of downgraded QoS levels and their respective one or more QoS parameters currently supported in the second network node.

This enables the first network node to decide one or more QoS parameters for the first radio resources to be provided to the UE from the first network node in the MR-DC. This deciding is based on the first set of downgraded QoS levels and their respective one or more QoS parameters currently supported in the first network node and the second set of downgraded QoS levels and their respective one or more QoS parameters currently supported in the second network node.

The second network node decides one or more QoS parameters for the second radio resources to be provided to the UE from the second network node in the MR-DC. This deciding is based on the first set of downgraded QoS levels and their respective one or more QoS parameters currently supported in the first network node and the second set of downgraded QoS levels and their respective one or more QoS parameters currently supported in the second network node.

According to another aspect of embodiments herein, the object is achieved by a first network node configured to handle one or more Quality of Service, QoS, parameters for respective first and second radio resources to be provided to a User Equipment, UE, in Multi Radio access technology—Dual Connectivity, MR-D. The first network node is operable in the MR-DC with a second network node in a wireless communications network. The first network node is further configured to:

Send a first indication to the second network node, which first indication is adapted to indicate a first set of downgraded QoS levels and their respective one or more QoS parameters currently supported in the first network node, which first indication further is adapted to enable the second network node to decide one or more QoS parameters for the second radio resources to be provided to the UE from the second network node in the MR-DC, based on the first set of downgraded QoS levels and their respective one or more QoS parameters currently supported in the first network node and a second set of downgraded QoS levels and their respective one or more QoS parameters currently supported in the second network node, receive a second indication from the second network node, which second indication is adapted to indicate the second set of downgraded QoS levels and their respective one or more QoS parameters currently supported in the second network node, and decide one or more QoS parameters for the first radio resources to be provided to the UE from the first network node in the MR-DC, based on the first set of downgraded QoS levels and their respective one or more QoS parameters currently supported in the first network node and the second set of downgraded QoS levels and their respective one or more QoS parameters currently supported in the second network node.

According to another aspect of embodiments herein, the object is achieved by a second network node configured to handle one or more Quality of Service, QoS, parameters for respective first and second radio resources to be provided to a User Equipment, UE, in Multi Radio access technology—Dual Connectivity, MR-DC. The second network node is operable in the MR-DC with a first network node in a wireless communications network. The second network node is further configured to:

Receive a first indication from the first network node, which first indication is adapted to indicate a first set of downgraded QoS levels and their respective one or more QoS parameters currently supported in the first network node, send a second indication to the first network node, which second indication is adapted to indicate a second set of downgraded QoS levels and their respective one or more QoS parameters currently supported in the second network node, which second indication is further adapted to enable the first network node to decide one or more QoS parameters for the first radio resources to be provided to the UE from the first network node in the MR-DC, based on the first set of downgraded QoS levels and their respective one or more QoS parameters currently supported in the first network node and the second set of downgraded QoS levels and their respective one or more QoS parameters currently supported in the second network node, and decide one or more QoS parameters for the second radio resources to be provided to the UE from the second network node in the MR-DC, based on the first set of downgraded QoS levels and their respective one or more QoS parameters currently supported in the first network node and the second set of downgraded QoS levels and their respective one or more QoS parameters currently supported in the second network node.

It is furthermore provided herein a computer program product comprising instructions, which, when executed on at least one processor, cause the at least one processor to carry out any of the methods above, as performed by the apparatus. It is additionally provided herein a computer-readable storage medium, having stored there on a computer program product comprising instructions which, when executed on at least one processor, cause the at least one processor to carry out the method according to any of the methods above, as performed by the apparatus.

BRIEF DESCRIPTION OF THE DRAWINGS

Examples of embodiments herein are described in more detail with reference to attached drawings in which:

FIG. 5 is a flowchart depicting embodiments of a method in a first network node.

FIG. 6 is a flowchart depicting embodiments of a method in a second network node.

DETAILED DESCRIPTION

Some example embodiments herein provide that an indication of currently supported QoS parameters related to alternative QoS profiles, also referred to as alternative or downgraded QoS levels, is exchanged between an MN and an SN, e.g. via Xn dual connectivity messages. The MN and SN are also referred to as first and second network nodes. In this way, the two network nodes, e.g. the MN and the SN, are aware of what downgraded QoS levels with their respective QoS parameters are supported in the other node, e.g. in each node. The QoS parameters may e.g. be one or more of a GBR, a PDB and a PER. A list of potential alternative QoS parameters of the downgraded QoS levels in the MN or SN may be sent to the SN or MN to select which QoS levels should be supported by the other node.

For instance, a network node, such as an MN, may communicate, e.g. in an SN addition request message, the current supported QoS level and the list of downgraded QoS levels with their respective QoS parameters that should be supported. As an example, Level1 with higher QoS parameters close to the QoS profile, Level2 with moderate QoS parameters quite far from the QoS profile, Level3 with lesser values of QoS parameters very far from the QoS profile. The SN may select, in an Xn accept message, an appropriate level, which may not necessarily be the highest level, and communicate it to the MN in the SN Acknowledge message.

Embodiments herein enable improved handling of QoS profiles, also referred to as QoS levels, and their respective QoS parameters, during MR-DC operations with the MN and the SN. Coordination between the MN and SN and support of the current QoS level with potential downgrade to downgraded QoS levels and their parameters is guaranteed during MR-DC operations such as e.g. SN change, SN modification, SN addition and inter-MN handover.

Figure 1:
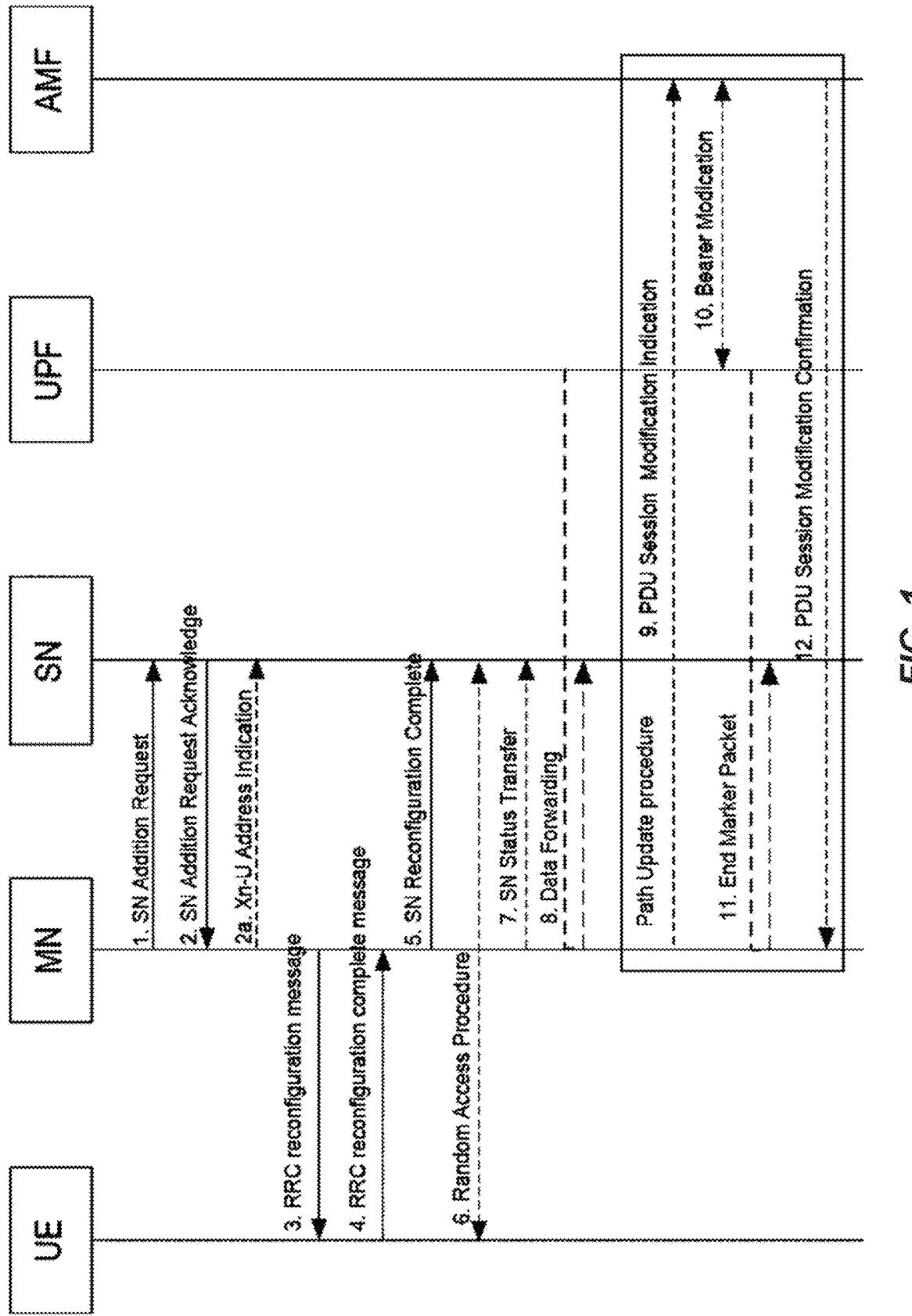
FIG. 1 is a sequence diagram illustrating prior art.
Figure 2:
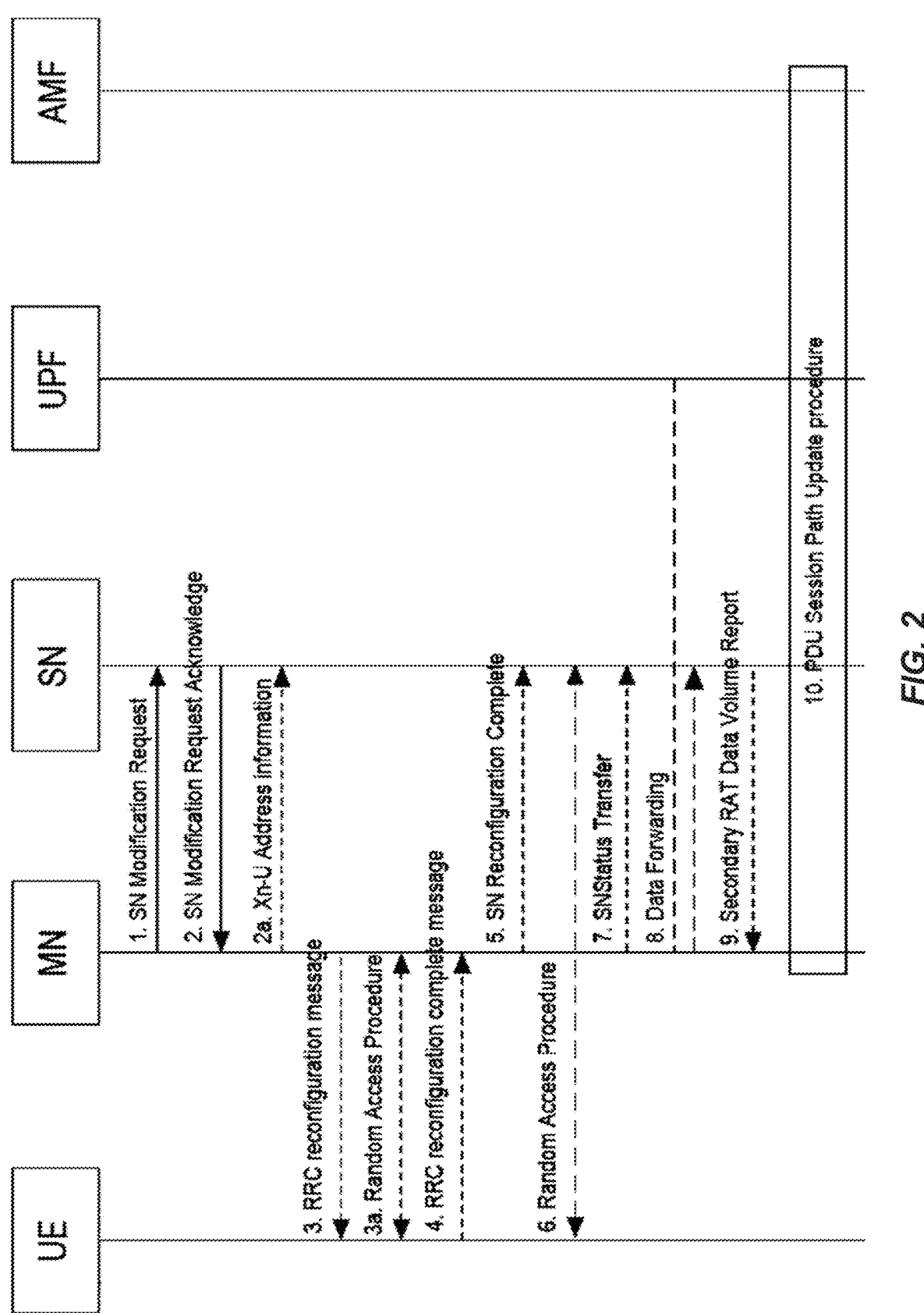
FIG. 2 is a sequence diagram illustrating prior art.
Figure 3A:
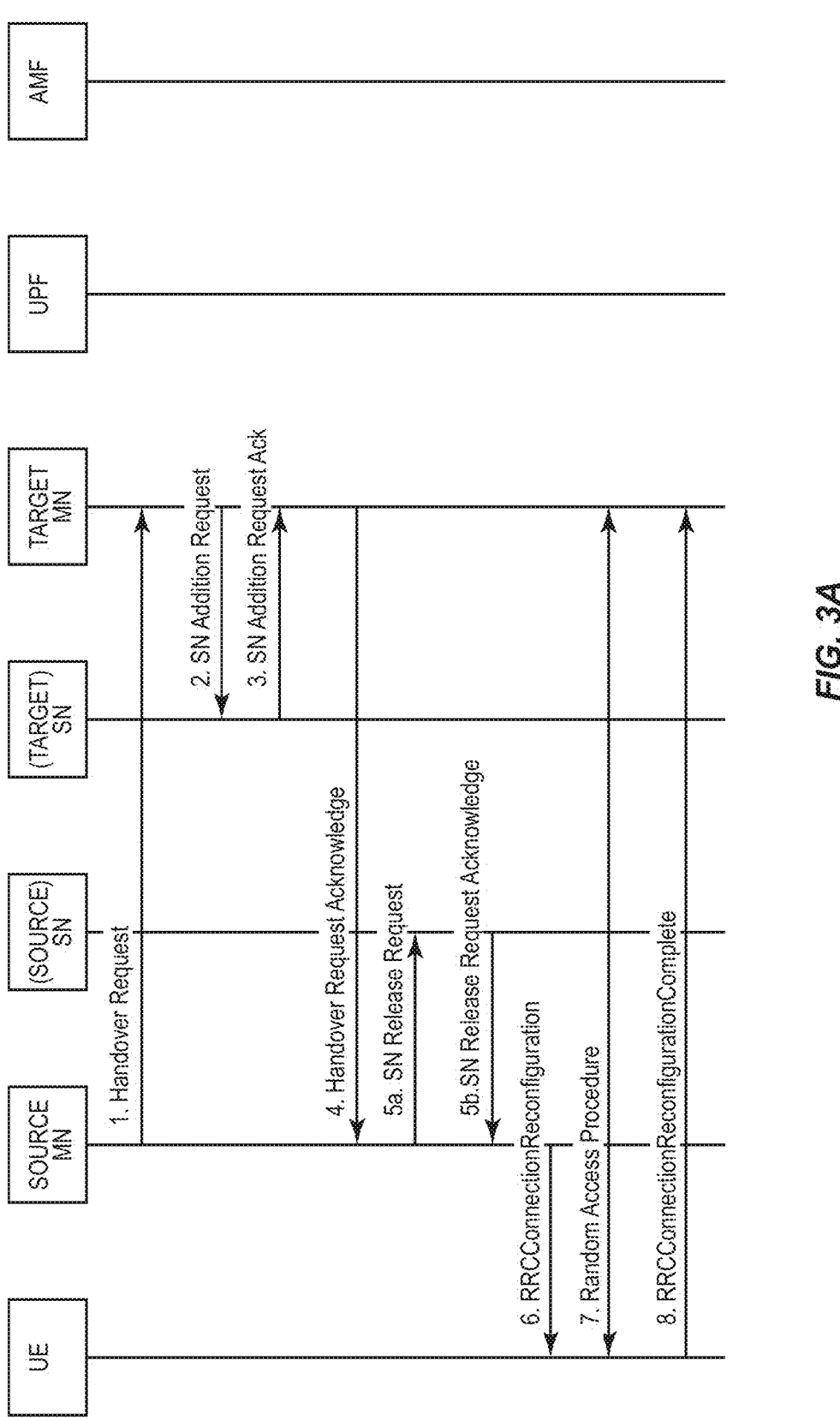
FIGS. 3a and b are sequence diagram illustrating prior art.
Figure 3B:
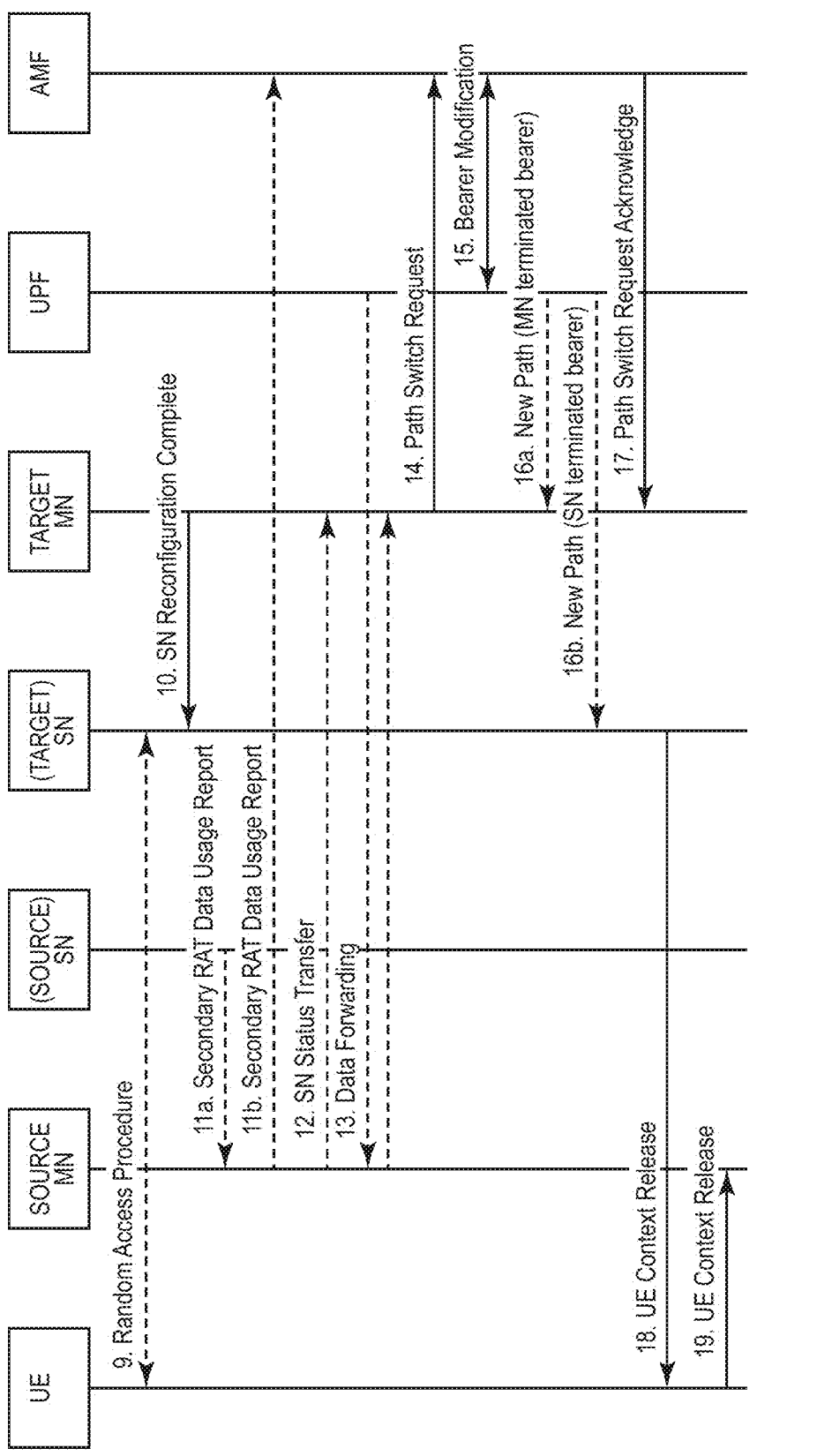
Figure 4:
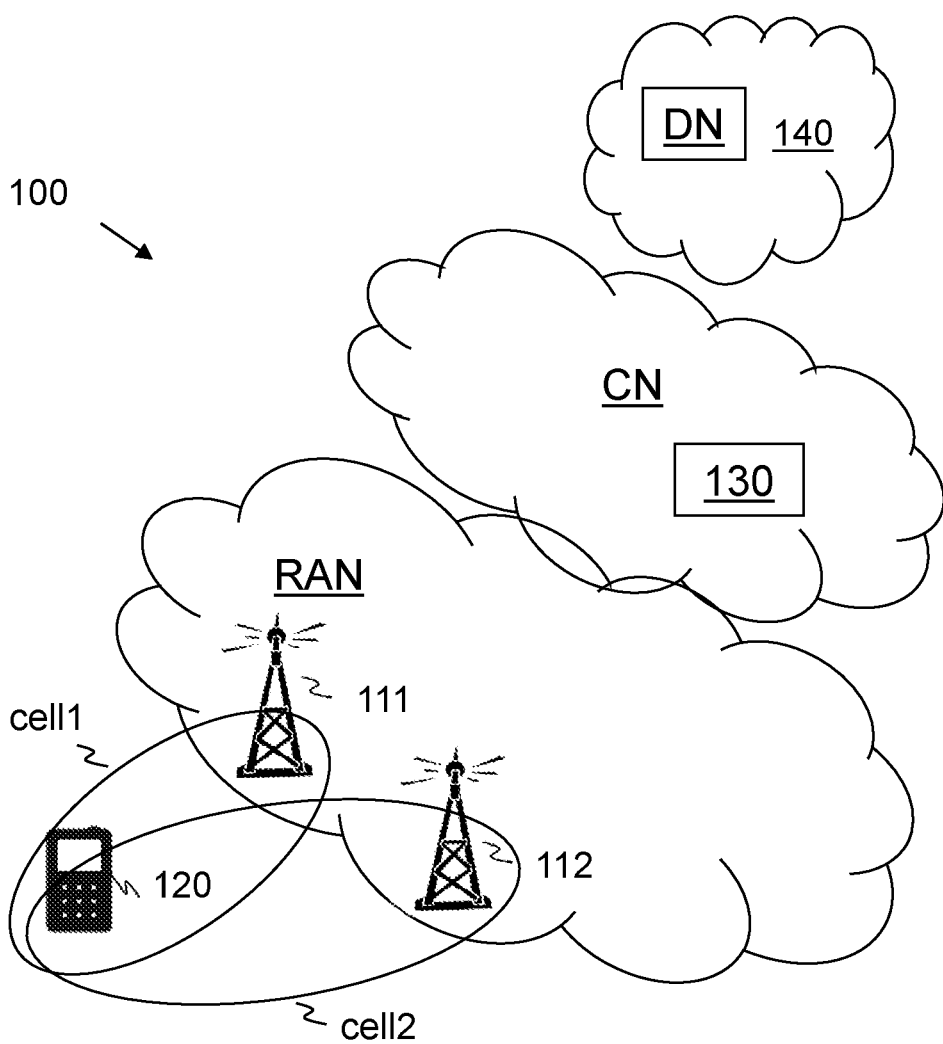
FIG. 4 is a schematic block diagram illustrating embodiments of a wireless communications network.

FIG. 4 is a schematic overview depicting a wireless communications network 100 wherein embodiments herein may be implemented. The wireless communications network 100 comprises one or more RANs and one or more CNs. The wireless communications network 100 may use 5G NR but may further use a number of other different technologies, such as, Long Term Evolution (LTE), LTE-Advanced, Wideband Code Division Multiple Access (WCDMA), Global System for Mobile communications/enhanced Data rate for GSM Evolution (GSM/EDGE), or Ultra Mobile Broadband (UM B), just to mention a few possible implementations.

Network nodes such as a first network node 111 and a second network node 112 operates in the wireless communications network 100. The respective first and second network nodes 111, 112 e.g. provides a number of cells, e.g. referred to as cell1 and cell2, and may use these cells for communicating with e.g. a UE 120. The respective first and second network nodes 111, 112 may be transmission and reception points e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Device to Device (D2D) communication, or any other network unit capable of communicating with a UE within any of cell1 and cell2 served by The respective first and second network nodes 111, 112 depending e.g. on the radio access technology and terminology used. The respective first and second network nodes 111, 112 may e.g. operate as either a MN or SN in MR-DC.

User Equipments operate in the wireless communications network 100, such as a UE 120. The UE 120 may e.g. be an NR device, a mobile station, a wireless terminal, an NB-IoT device, an eMTC device, an NR RedCap device, a CAT-M device, a WiFi device, an LTE device and an a non-access point (non-AP) STA, a STA, that communicates via a base station such as e.g. the first network node 111 or second network node 112, one or more Access Networks (AN), e.g. RAN, to one or more core networks (CN). It should be understood by the skilled in the art that the UE relates to a non-limiting term which means any UE, terminal, wireless communication terminal, user equipment, (D2D) terminal, or node e.g. smart phone, laptop, mobile phone, sensor, relay, mobile tablets or even a small base station communicating within a cell.

CN nodes such as a CN node 130 operates in the wireless communications network 100. The CN node may e.g. be an AMF node or an SMF node.

Methods herein may in one aspect be performed by the first network node 111 and in another aspect by the second network node 112. As an alternative, a Distributed Node (DN) and functionality, e.g. comprised in a cloud 140 as shown in FIG. 4, may be used for performing or partly performing the methods.

FIG. 5 shows an example method performed by the first network node 111 e.g. for handling one or more QoS parameters for respective first and second radio resources to be provided to the UE 120, in MR-DC. The first network node 111 operates in the MR-DC with a second network node 112 in the wireless communications network 100. The first network node 111 may be represented by any one out of a master node or a secondary node. I.e., the first network node 111 may for example be a master node or a secondary node. The second network node 112 may be represented by any one out of a secondary node when the first network node 111 is a master node or a master node when the first network node 111 is a secondary node. I.e. the second network node 112 may for example be a secondary node when the first network node 111 is a master node or a master node when the first network node 111 is a secondary node.

The method comprises any one or more out of the actions below, which actions may be taken in any suitable order. Actions that are optional are presented in dashed boxes in FIG. 5.

Action 501

Radio resources may be provided by network nodes such as the first network node 111 to UEs such as the UE 120 in the wireless communications network 100. The radio resources may be provided at different levels of QoS.

In some embodiments, the first network node 111 may establish a current supported QoS and its one or more QoS parameters.

The first network node 111 may further establish a first set of downgraded QoS levels and their respective one or more QoS parameters currently supported in the first network node 111. It should be noted that the downgraded QoS levels may also be referred to as alternative QoS profiles, or alternative QoS levels.

The one or more QoS parameters may comprise one or more out of: Guaranteed Bit Rate, GBR, Packet Delay Budget, PDB, and Packet Error Rate, PER.

Action 502

In order to handle one or more QoS parameters for respective first and second radio resources to be provided to the UE 120 in MR-DC, the first network node 111 may need to inform the second network node 112 of currently supported downgraded QoS levels.

The first network node 111 sends a first indication to the second network node 112. The first indication indicates the first set of downgraded QoS levels and their respective one or more QoS parameters currently supported in the first network node 111. The first indication enables the second network node 112 to decide one or more QoS parameters for the second radio resources to be provided to the UE 120 from the second network node 112 in the MR-DC. The decision of the one or more QoS parameters is based on the first set of downgraded QoS levels and their respective one or more QoS parameters currently supported in the first network node 111 and a second set of downgraded QoS levels and their respective one or more QoS parameters currently supported in the second network node 112. The downgraded QoS levels and their respective one or more QoS parameters may e.g. be referred to as alternative QoS profiles and parameters or degraded QoS profiles and parameters.

In some embodiments the first indication further indicates the established current QoS and its one or more QoS parameters, enabling the second network node 112 to decide one or more QoS parameters for the second radio resources to be provided to the UE 120 from the second network node 112 in the MR-DC, is further based on the established current QoS and its one or more QoS parameters. An advantage is that knowledge of QoS currently established in the first network node 111, improves the decision when the second network node 112 decides QoS parameters for radio resources to be provided to the UE 120.

The first indication may be sent to the second network node 112 in an Xn dual connectivity message.

Action 503

Knowledge of downgraded QoS levels currently supported in the second network node 112 may be needed to handle the one or more QoS parameters for the respective first and second radio resources to be provided to the UE 120 in MR-DC.

The first network node 111 receives a second indication from the second network node 112. The second indication indicates the second set of downgraded QoS levels and their respective one or more QoS parameters currently supported in the second network node 112.

Knowledge of QoS currently established in the second network node 112, improves the decision when deciding, in the first network node 111, QoS parameters for radio resources to be provided to the UE 120.

In some embodiments, the second indication may further indicate an established current QoS and its one or more QoS parameters in the second network node 112. This allows the first network node 111 to considered also the current QoS established in second network node 112.

The second indication may be received from the second network node 112 in an Xn dual connectivity message.

Action 504

When providing radio resources to the UE 120, the first network node 111 takes a decision on what QoS parameters for the radio resources to apply.

The first network node 111 decides one or more QoS parameters for the first radio resources to be provided to the UE 120 from the first network node 111 in the MR-DC. The decision is based on the first set of downgraded QoS levels and their respective one or more QoS parameters currently supported in the first network node 111 and the second set of downgraded QoS levels and their respective one or more QoS parameters currently supported in the second network node 112. By basing the decision of the one or more QoS parameters on both the first and second sets of downgraded QoS levels and their respective QoS parameters, the radio resources provided to the UE 120 in MR-DC is coordinated between the first network node 111 and the second network node 112. This is an advantage.

In some embodiments, the first network node 111 decides the one or more QoS parameters for the first radio resources to be provided to the UE 120 from the first network node 111 in the MR-DC, further based on the current QoS and its one or more QoS parameters established in the second network node 112. Considering also the current QoS established in the second network node 112, may result in better coordination when providing radio resources to the UE 120 in MR-DC. The decision may further be based on the current QoS and its one or more QoS parameters established in the first network node 111.

FIG. 6 shows an example method performed by the second network node 112 e.g., for handling one or more QoS parameters for respective first and second radio resources to be provided to the UE 120 in MR-DC. The second network node 112 operates in the MR-DC with the first network node 111 in the wireless communications network 100. The second network node 112 may be represented by any one out of a master node or a secondary node. I.e. the second network node 112 may for example be a master node or a secondary node. The first network node 111 may be represented by any one out of a secondary node when the second network node 112 is a master node or a master node when the second network node 112 is a secondary node. I.e. the first network node 111 may for example be a secondary node when the second network node 112 is a master node or a master node when the second network node 112 is a secondary node.

The method comprises any one or more out of the actions below, which actions may be taken in any suitable order. Actions that are optional are presented in dashed boxes in FIG. 6.

Action 601

As mentioned above, radio resources are provided to UEs such as the UE 120 in the wireless communications network 100. The radio resources may be provided at different levels of QoS.

In some embodiments, the second network node 112 establishes a current supported QoS and its one or more QoS parameters, and the second set of downgraded QoS levels and their respective one or more QoS parameters currently supported in the second network node 112.

The one or more QoS parameters may comprise one or more out of GBR, PDB, and PER.

Action 602

In order to handle the one or more QoS parameters for respective first and second radio resources to be provided to the UE 120 in MR-DC, the second network node 112 may need to know currently supported downgraded QoS levels in the first network node 111.

The second network node 112 receives the first indication from the first network node 111. The first indication indicates the first set of downgraded QoS levels and their respective one or more QoS parameters currently supported in the first network node 111. The downgraded QoS levels and their respective one or more QoS parameters may e.g. be referred to as alternative QoS profiles and parameters or degraded QoS profiles and parameters.

In some embodiments, the first indication further indicates a current QoS and its one or more QoS parameters established in the first network node 111. This allows the second network node 112 to considered also the current QoS established in first network node 111.

The first indication may be received from the first network node 111 in an Xn dual connectivity message.

Action 603

Knowledge of downgraded QoS levels currently supported in the second network node 112 may be needed for the first network node 111 to handle the one or more QoS parameters for the respective first and second radio resources to be provided to the UE 120 in MR-DC.

The second network node 112 sends the second indication to the first network node 111. The second indication indicates the second set of downgraded QoS levels and their respective one or more QoS parameters currently supported in the second network node 112. The second indication enables the first network node 111 to decide one or more QoS parameters for the first radio resources to be provided to the UE 120 from the first network node 111 in the MR-DC. The decision is based on the first set of downgraded QoS levels and their respective one or more QoS parameters currently supported in the first network node 111 and the second set of downgraded QoS levels and their respective one or more QoS parameters currently supported in the second network node 112.

Knowledge of QoS currently established in the second network node 112, improves the decision when deciding, in the first network node 111, QoS parameters for radio resources to be provided to the UE 120.

In some embodiments, the second indication further indicates the established current QoS and its one or more QoS parameters, enabling the first network node 111 to decide one or more QoS parameters for the first radio resources to be provided to the UE 120 from the first network node 111 in the MR-DC, further based on the established current QoS and its one or more QoS parameters.

The second indication may be sent to the first network node 111 in an Xn dual connectivity message.

Action 604

When providing radio resources to the UE 120, the second network node 112 takes a decision on what QoS parameters for the radio resources to apply.

The second network node 112 decides one or more QoS parameters for the second radio resources to be provided to the UE 120 from the second network node 112 in the MR-DC. The decision is based on the first set of downgraded QoS levels and their respective one or more QoS parameters currently supported in the first network node 111 and the second set of downgraded QoS levels and their respective one or more QoS parameters currently supported in the second network node 112. By basing the decision of the one or more QoS parameters on both the first and second sets of downgraded QoS levels and their respective QoS parameters, the radio resources provided to the UE 120 in MR-DC is coordinated between the first network node 111 and the second network node 112. This is an advantage.

In some embodiments, the second network node 112 decides one or more QoS parameters for the second radio resources to be provided to the UE 120 from the second network node 112 in the MR-DC, further is based on the, in the first network node 111, established current QoS and its one or more QoS parameters. Considering also the current QoS established in the first network node 111, will result in better coordination when providing radio resources to the UE 120 in MR-DC. The decision may further be based on the current QoS and its one or more QoS parameters established in the second network node 112.

The method will now be further explained and exemplified in below embodiments. These below embodiments may be combined with any suitable embodiment as described above.

An alternative QoS profile or degraded QoS Profile, corresponds to a QoS profile with alternative QoS Parameters or downgraded QoS levels and their respective QoS parameters.

In a first example embodiment, the first network node 111 is referred to as MN or primary node and the second network node 112 is referred to as SN or secondary node.

E.g. during addition, modification or changing of the SN, such as the second network node 112, the MN, such as the first network node 111, sends a list, or portion of the list, of alternative QoS profiles, such as e.g. downgraded QoS levels and their respective QoS parameters, to the SN, such as the second network node 112.

This may mean that during addition, modification or changing of the SN, the MN sends a list, or portion of the list, of alternative QoS profiles and their respective QoS parameters to the SN.

The list of alternative QoS profiles may be communicated from the 5GC during initial PDU session establishment. The MN, such as the first network node 111, may further send a current QoS profile, such as e.g. current QoS and its one or more QoS parameters, to the SN, such as the second network node 112. The current and alternative QoS profiles may be sent via Xn messages. For instance, when the MN, such as the first network node 111, sends a S-NODE ADDITION REQUEST message to the SN, such as the second network node 112, it may request the SN, such as the second network node 112, to support at least one level of alternative QoS profile, or to not go below a specific level of alternative QoS profile with specific values of alternative QoS parameters.

In response to receiving the list, or portion of the list, of alternative QoS profiles, the SN, such as the second network node 112, may send the alternative QoS parameters, e.g. as an index, that the SN, such as the second network node 112, decides it supports for the degraded QoS profile, such as e.g. the downgraded QoS levels and their respective QoS parameters, to the MN such as the first network node 111. In case the SN, such as the second network node 112, cannot support at least one of the requested levels of alternative QoS profile, or only supports alternative QoS profiles below the specific level, the SN, such as the second network node 112, may send an S-NODE ADDITION REQUEST REJECT message, e.g. comprising a cause value related to the rejection, to the MN, such as the first network node 111.

The MN, such as the first network node 111, may, when needed, send a message to the SN, such as the second network node 112. The message indicates that the QoS profile, such as e.g. the current QoS and its one or more QoS parameters, and the set of Alternative QoS parameters, such as e.g. downgraded QoS levels and their respective QoS parameters, supportable for this QoS profile have been updated or removed. The message may be sent via Xn messages. For instance, when the MN, such as the first network node 111, sends a S-NODE MODIFICATION REQUEST message to the SN, such as the second network node 112, it may request the modification of an already degraded QoS profile with alternative QoS parameters, such as e.g. the downgraded QoS levels and their respective QoS parameters, in the SN, such as the second network node 112, by exchanging the new alternative QoS parameters, that should be supported.

The SN, such as the second network node 112, may receive an Xn message from the MN node, such as the first network node 111, that comprises new alternative QoS parameters that may be supported, e.g. during the addition, modification, or changing of the SN, such as the second network node 112, while keeping the MN, such as the first network node 111. Upon decoding the message the secondary node may reply to the MN, such as the first network node 111, with an Xn message to confirm that the QoS profile with alternative QoS parameters can be guaranteed, e.g. that the degraded QoS profile can be supported and enough resources in the SN such as the second network node 112, are available to select one set of alternative QoS parameters).

In case none of the of the new alternative QoS profiles received from the MN, such as the first network node 111, is supported by the SN, such as the second network node 112, the SN, such as the second network node 112, may send a reject message, e.g. comprising a cause value related to the rejecting, to the MN, such as the first network node 111.

The SN, such as the second network node 112, may e.g. send a S-NODE MODIFICATION REQUEST ACKNOWLEDGE message to the MN, such as the first network node 111, to inform the MN that its request to modify the supported level of the degraded QoS profile has been guaranteed. Or the SN, such as the second network node 112, my send a S-NODE MODIFICATION REQUEST REJECT the MN, such as the first network node 111, that its request has failed and that the alternative QoS profile is not guaranteed. Or the SN, such as the second network node 112, may indicate what possible QoS profile other than the degraded QoS profile that it supports.

In case the UE, such as the UE 120, is connected to one MN, such as the first network node 111, and more than one SNs, such as the second network node 112, the inter-node exchange of alternative QoS parameters may happen between the MN, such as the first network node 111, and one or more selected SNs, such as the second network node 112, or just between the selected SNs, such as the second network node 112.

In a second example embodiment, the first network node is referred to as SN or secondary node and the second network node is referred to as MN or primary node.

In some cases the secondary node, such as the first network node 111, may take the initiative by informing or updating the MN, such as the second network node 112, about the supported level of QoS profile and the alternative QoS profiles that should be supported via an Xn message. This may happen e.g. when MN, such as the second network node 112, requests SN, such as the first network node 111, to provide new information of its configuration or when the MN, such as the second network node 112, changes and SN, such as the first network node 111, remains the same. Or it may happen at any time when SN, such as the first network node 111, determines that the QoS profile needs to be changed due to SN, such as the first network node 111, bearers of UEs under the coverage of the SN, such as the first network node 111, are setup or released. The MN, such as the second network node 112, may then confirm the alternative QoS profile proposed by the SN, such as the first network node 111, by acknowledging this to SN, such as the first network node 111.

The MN, such as the second network node 112, may reject the alternative QoS profile proposed by the SN, such as the first network node 111, and inform the SN, such as the first network node 111, that the QoS profile is not guaranteed. For instance, the SN, such as the first network node 111, may send an S-NODE MODIFICATION REQUIRED message to the MN, such as the second network node 112, to report the proposed alternative QoS profile. Upon decoding the Xn message, the MN, such as the second network node 112, may send the S-NODE MODIFICATION CONFIRM message to inform the SN, such as the first network node 111, about the successful QoS profile degradation to an alternative QoS profile. Or the MN, such as the second network node 112, may send to the SN, such as the first network node 111, the S-NODE MODIFICATION REFUSE to inform that the SN initiated node modification has failed.

In case the UE, such as the UE 120, is connected to one MN, such as the second network node 112, and more than SNs, such as the first network node 111, the inter-node exchange of alternative QoS parameters may happen between the MN, such as the second network node 112, and one or more selected SNs, such as the first network node 111, or just between the selected SNs, such as the first network node 111.

Figures 7A, 7B:
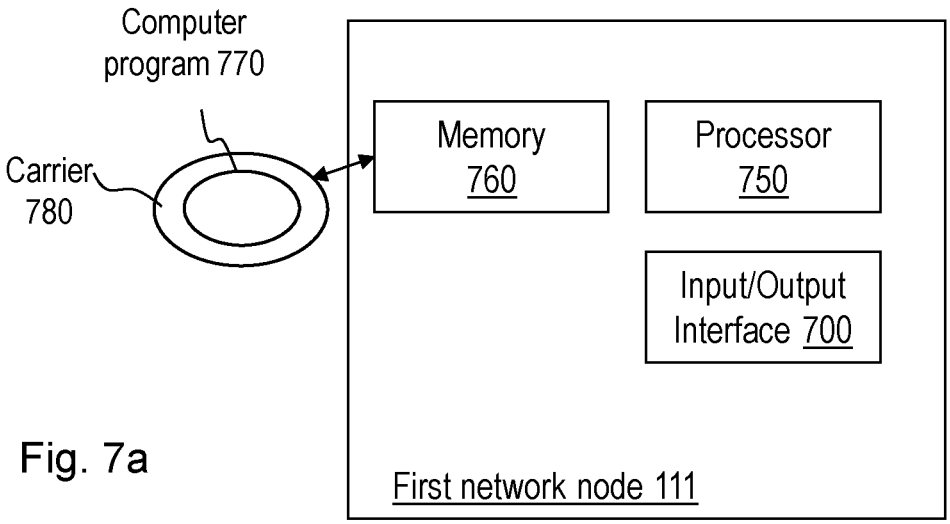
FIGS. 7a and b are schematic block diagrams illustrating embodiments of a first network node.

FIGS. 7a and 7b shows an example of arrangement in the first network node 111. The first network node 111 is configured to handle one or more QoS parameters for respective first and second radio resources to be provided to a UE 120 in MR-DC. The first network node 111 is operable in the MR-DC with a second network node 112 in a wireless communications network 100.

The first network node 111 may be represented by any one out of: A master node or a secondary node. The second network node 112 may be represented by any one out of: A secondary node when the first network node 111 is a master node or a master node when the first network node 111 is a secondary node.

The first network node 111 may comprise an input and output interface 700 configured to communicate with each other. The input and output interface may comprise a wireless receiver (not shown) and a wireless transmitter (not shown).

The first network node 111 may further be configured to, e.g. means of an establishing unit 710 unit in the first network node 111, establish in the first network node 111, a current supported QoS and its one or more QoS parameters, and the first set of downgraded QoS levels and their respective one or more QoS parameters currently supported in the first network node 111.

The one or more QoS parameters may be adapted to comprise one or more out of: GBR, PDB and PER.

The first network node 111 is further configured to, e.g. means of a sending unit 720 in the first network node 111, send a first indication to the second network node 112. The first indication is adapted to indicate a first set of downgraded QoS levels and their respective one or more QoS parameters currently supported in the first network node 111. The first indication is further adapted to enable the second network node 112 to decide one or more QoS parameters for second radio resources to be provided to the UE 120 from the second network node 112 in the MR-DC. The decision is based on the first set of downgraded QoS levels and their respective one or more QoS parameters currently supported in the first network node 111 and a second set of downgraded QoS levels and their respective one or more QoS parameters currently supported in the second network node 112, The first indication may further be adapted to indicate the established current QoS and its one or more QoS parameters, enabling the second network node 112 to decide one or more QoS parameters for the second radio resources to be provided to the UE 120 from the second network node 112 in the MR-DC, further based on the established current QoS and its one or more QoS parameters.

The first indication may be adapted to be sent to the second network node 112 in an Xn dual connectivity message, The first network node 111 is further configured to, e.g. means of a receiving unit 730 in the first network node 111, receive a second indication from the second network node 112. The second indication is adapted to indicate the second set of downgraded QoS levels and their respective one or more QoS parameters currently supported in the second network node 112.

The second indication may further be adapted to indicate a current QoS and its one or more QoS parameters established in the second network node 112.

The second indication may be adapted to be received from the second network node 112 in an Xn dual connectivity message.

The first network node 111 is further configured to, e.g. means of a deciding unit 740 in the first network node 111, decide one or more QoS parameters for the first radio resources to be provided to the UE 120 from the first network node 111 in the MR-DC. The decision is based on the first set of downgraded QoS levels and their respective one or more QoS parameters currently supported in the first network node 111 and the second set of downgraded QoS levels and their respective one or more QoS parameters currently supported in the second network node 112.

The first network node 111 may further be configured to, e.g. means of the deciding unit 740 in the first network node 111, decide the one or more QoS parameters for the first radio resources to be provided to the UE 120 from the first network node 111 in the MR-DC, further based on the current QoS and its one or more QoS parameters established in the second network node 112.

The embodiments herein may be implemented through a respective processor or one or more processors, such as the processor 750 of a processing circuitry in the first network node 111 depicted in FIG. 7a, together with computer program code for performing the functions and actions of the embodiments herein. The program code mentioned above may also be provided as a computer program product, for instance in the form of a data carrier carrying computer program code for performing the embodiments herein when being loaded into the first network node 111. One such carrier may be in the form of a CD ROM disc. It is however feasible with other data carriers such as a memory stick. The computer program code may furthermore be provided as pure program code on a server and downloaded to the first network node 111.

The first network node 111 may further comprise respective a memory 760 comprising one or more memory units. The memory 760 comprises instructions executable by the processor 750 in the first network node 111.

The memory is arranged to be used to store instructions, data, configurations, indications, QoS levels, QoS parameters and applications to perform the methods herein when being executed in the first network node 111.

In some embodiments, a computer program 770 comprises instructions, which when executed by the at least one processor 750, cause the at least one processor 750 of the first network node 111 to perform the actions above.

In some embodiments, a respective carrier 780 comprises the respective computer program 770, wherein the carrier 780 is one of an electronic signal, an optical signal, an electromagnetic signal, a magnetic signal, an electric signal, a radio signal, a microwave signal, or a computer-readable storage medium.

Those skilled in the art will also appreciate that the functional modules in the first network node 111, described below may refer to a combination of analog and digital circuits, and/or one or more processors configured with software and/or firmware, e.g. stored in the first network node 111, that when executed by the respective one or more processors such as the processors described above cause the respective at least one processor to perform actions according to any of the actions above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 8A:
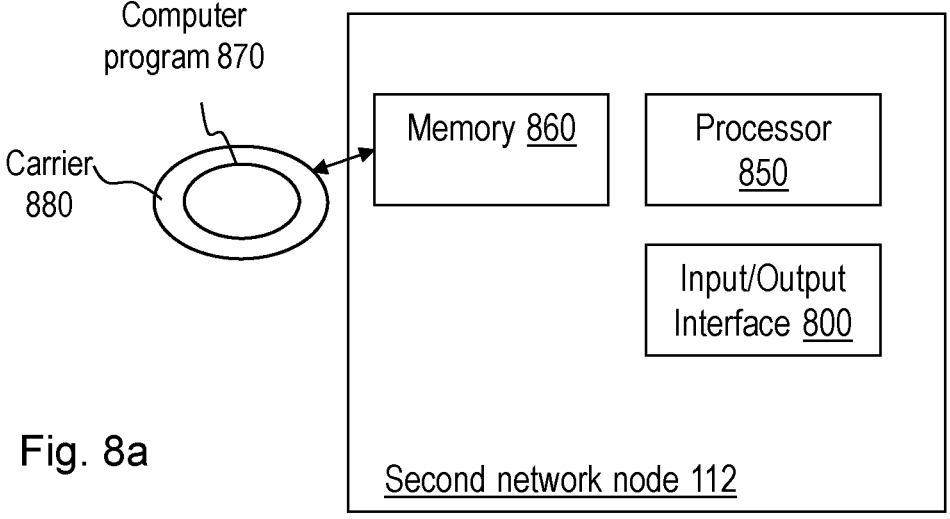
FIGS. 8a and b are schematic block diagrams illustrating embodiments of a first network node.
Figure 8B:
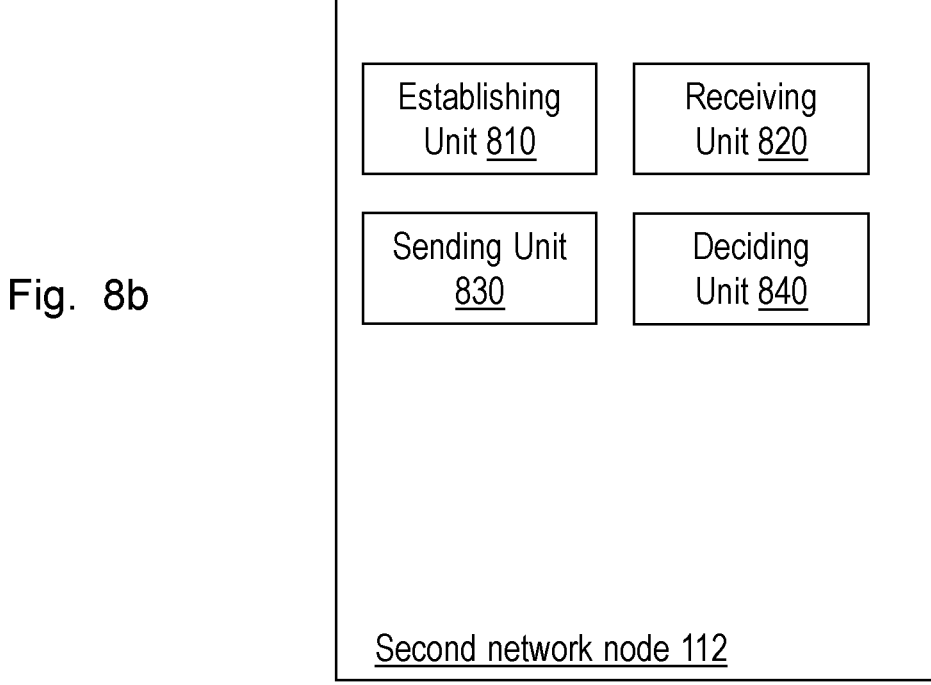

FIGS. 8a and 8b shows an example of arrangements in the second network node 112. The second network node 112 is e.g. configured to handle one or more QoS parameters for respective first and second radio resources to be provided to a UE 120 in MR-DC, which second network node 112 is operable in the MR-DC with a first network node 111 in a wireless communications network 100.

The second network node 112 may be represented by any one out of: A master node or a secondary node. The first network node 111 may be represented by any one out of: A secondary node when the second network node 112 is a master node or a master node when the second network node 112 is a secondary node.

The second network node 112 may comprise an input and output interface 800 configured to communicate with each other. The input and output interface may comprise a wireless receiver (not shown) and a wireless transmitter (not shown).

The second network node 112 may further be configured to, e.g. means of an establishing unit 810 unit in the second network node 112, establish in the second network node 112, a current supported QoS, and its one or more QoS parameters, and the second set of downgraded QoS levels and their respective one or more QoS parameters currently supported in the second network node 112.

The one or more QoS parameters may be adapted to comprises one or more out of: GBR, PDB and PER.

The second network node 112 is further configured to, e.g. means of a receiving unit 820 unit in the second network node 112, receive a first indication from the first network node 111. The first indication is adapted to indicate a first set of downgraded QoS levels and their respective one or more QoS parameters currently supported in the first network node 111.

The first indication may further be adapted to indicate the current QoS and its one or more QoS parameters established in the first network node 111.

The first indication may be adapted to be received from the first network node 111 in an Xn dual connectivity message.

The second network node 112 is further configured to, e.g. means of a sending unit 830 unit in the second network node 112, send a second indication to the first network node 111. The second indication is adapted to indicate the second set of downgraded QoS levels and their respective one or more QoS parameters currently supported in the second network node 112. The second indication is further adapted to enable the first network node 111 to decide one or more QoS parameters for the first radio resources to be provided to the UE 120 from the first network node 111 in the MR-DC. The decision is based on the first set of downgraded QoS levels and their respective one or more QoS parameters currently supported in the first network node 111 and the second set of downgraded QoS levels and their respective one or more QoS parameters currently supported in the second network node 112.

The second indication may further be adapted to indicate the established current QoS and its one or more QoS parameters, enabling the first network node 111 to decide one or more QoS parameters for the first radio resources to be provided to the UE 120 from the first network node 111 in the MR-DC, further based on the established current QoS and its one or more QoS parameters.

The second indication may be adapted to be sent to the first network node 111 in an Xn dual connectivity message.

The second network node 112 is further configured to, e.g. means of a deciding unit 840 unit in the second network node 112, decide one or more QoS parameters for the second radio resources to be provided to the UE 120 from the second network node 112 in the MR-DC. The decision is based on the first set of downgraded QoS levels and their respective one or more QoS parameters currently supported in the first network node 111 and the second set of downgraded QoS levels and their respective one or more QoS parameters currently supported in the second network node 112.

The second network node 112 may further be configured to, e.g. means of the deciding unit 840 unit in second network node 112, decide one or more QoS parameters for the second radio resources to be provided to the UE 120 from the second network node 112 in the MR-DC, further based on the current QoS and its one or more QoS parameters established in the first network node 111.

The embodiments herein may be implemented through a respective processor or one or more processors, such as the processor 850 of a processing circuitry in the second network node 112 depicted in FIG. 8a, together with respective computer program code for performing the functions and actions of the embodiments herein. The program code mentioned above may also be provided as a computer program product, for instance in the form of a data carrier carrying computer program code for performing the embodiments herein when being loaded into the second network node 112. One such carrier may be in the form of a CD ROM disc. It is however feasible with other data carriers such as a memory stick. The computer program code may furthermore be provided as pure program code on a server and downloaded to the second network node 112.

The second network node 112 may further comprise respective a memory 860 comprising one or more memory units. The memory 860 comprises instructions executable by the processor 850 in the second network node 112.

The memory is arranged to be used to store instructions, data, configurations, indications, QoS levels, QoS parameters and applications to perform the methods herein when being executed in the second network node 112.

In some embodiments, a computer program 870 comprises instructions, which when executed by the at least one processor 850, cause the at least one processor 850 of the second network node 112 to perform the actions above.

In some embodiments, a respective carrier 880 comprises the respective computer program 870, wherein the carrier 880 is one of an electronic signal, an optical signal, an electromagnetic signal, a magnetic signal, an electric signal, a radio signal, a microwave signal, or a computer-readable storage medium.

Those skilled in the art will also appreciate that the functional modules in the second network node 112, described below may refer to a combination of analog and digital circuits, and/or one or more processors configured with software and/or firmware, e.g. stored in the second network node 112, that when executed by the respective one or more processors such as the processors described above cause the respective at least one processor to perform actions according to any of the actions above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Further Extensions and Variations

Figure 9:
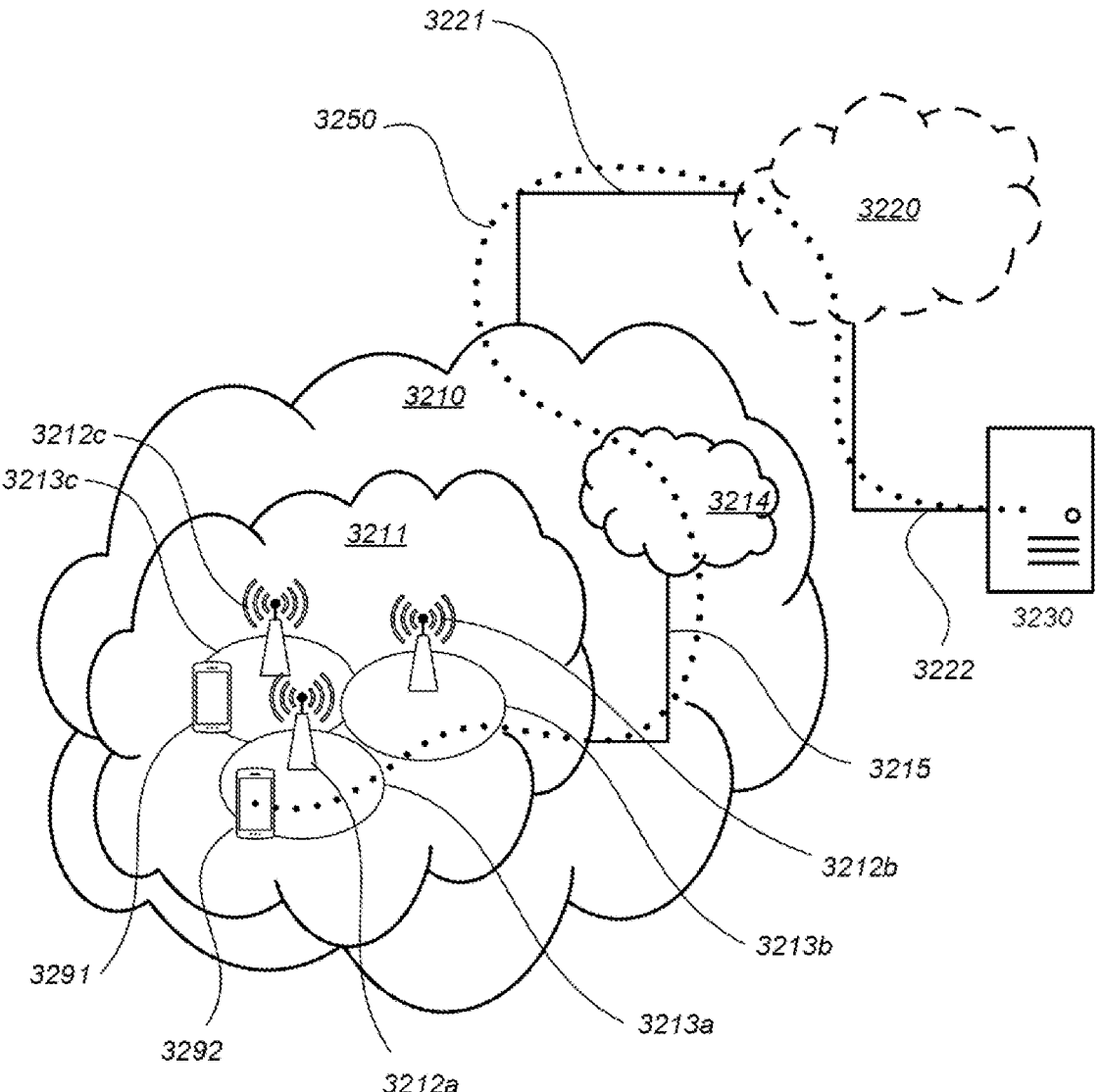
FIG. 9 schematically illustrates a telecommunication network connected via an intermediate network to a host computer.

With reference to FIG. 9, in accordance with an embodiment, a communication system includes a telecommunication network 3210 such as the wireless communications network 100, e.g. an IoT network, or a WLAN, such as a 3GPP-type cellular network, which comprises an access network 3211, such as a radio access network, and a core network 3214. The access network 3211 comprises a plurality of base stations 3212a, 3212b, 3212c, such as the network node 110, 130, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the UE 120 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

Figure 10:
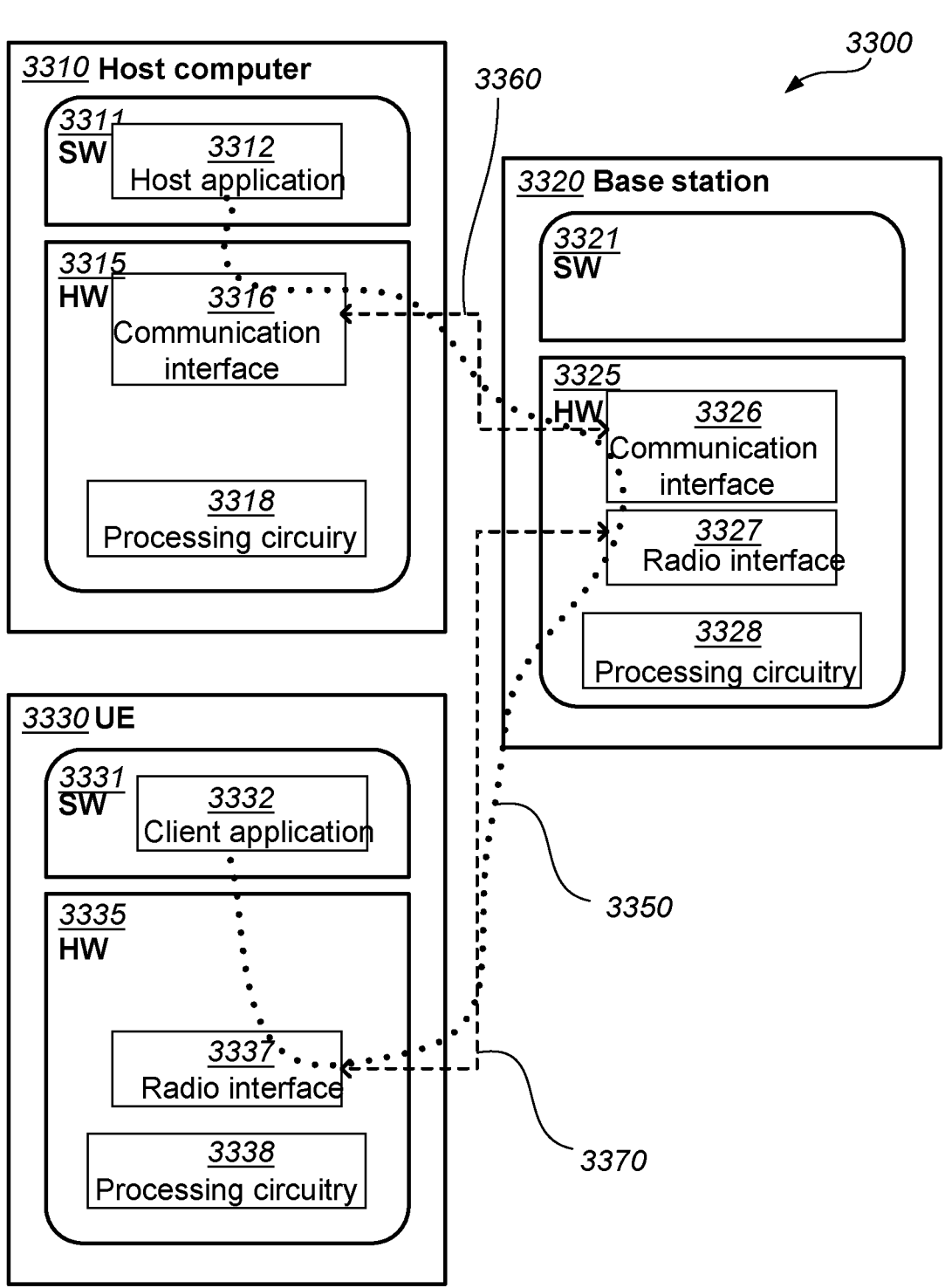
FIG. 10 is a generalized block diagram of a host computer communicating via a base station with a user equipment over a partially wireless connection.

The communication system of FIG. 10 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown)

adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown in FIG. 10) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figures 11, 12:
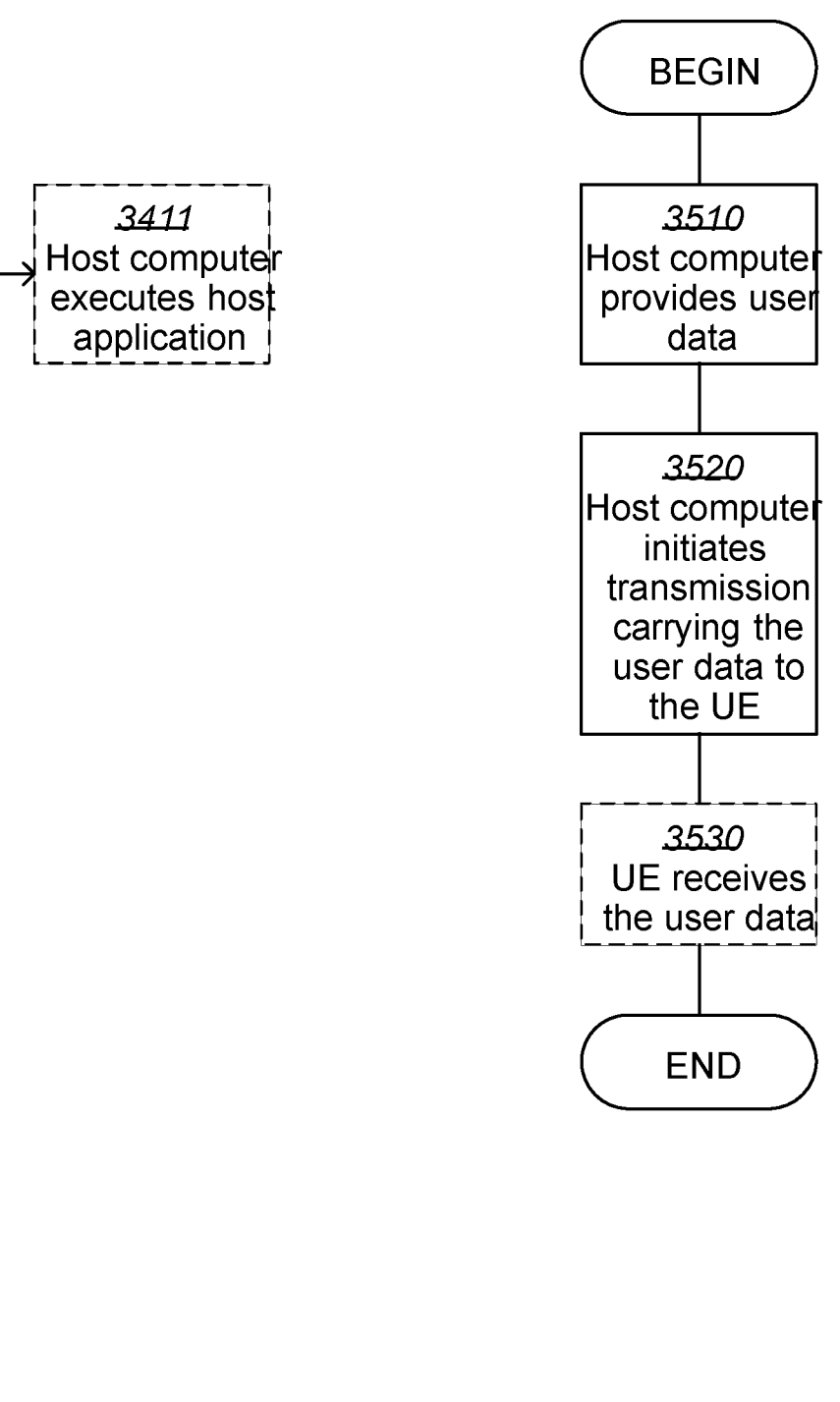
FIGS. 11-14 are flowcharts illustrating methods implemented in a communication system including a host computer, a base station and a user equipment.

It is noted that the host computer 3310, base station 3320 and UE 3330 illustrated in FIG. 10 may be identical to the host computer 3230, one of the base stations 3212a, 3212b, 3212c and one of the UEs 3291, 3292 of FIG. 11, respectively. This is to say, the inner workings of these entities may be as shown in FIG. 10 and independently, the surrounding network topology may be that of FIG. 9.

In FIG. 10, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the applicable RAN effect: data rate, latency, power consumption, and thereby provide benefits such as corresponding effect on the OTT service: e.g. reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 11 is a flowchart illustrating a method implemented in a communication system, in accordance with one embodiment. The communication system includes a host computer, a base station such as the network node 110, and a UE such as the UE 120, which may be those described with reference to FIG. 9 and FIG. 10. For simplicity of the present disclosure, only drawing references to FIG. 11 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 12 is a flowchart illustrating a method implemented in a communication system, in accordance with one embodiment. The communication system includes a host computer, a base station such as a AP STA, and a UE such as a Non-AP STA which may be those described with reference to FIG. 9 and FIG. 10. For simplicity of the present disclosure, only drawing references to FIG. 12 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figures 13, 14:
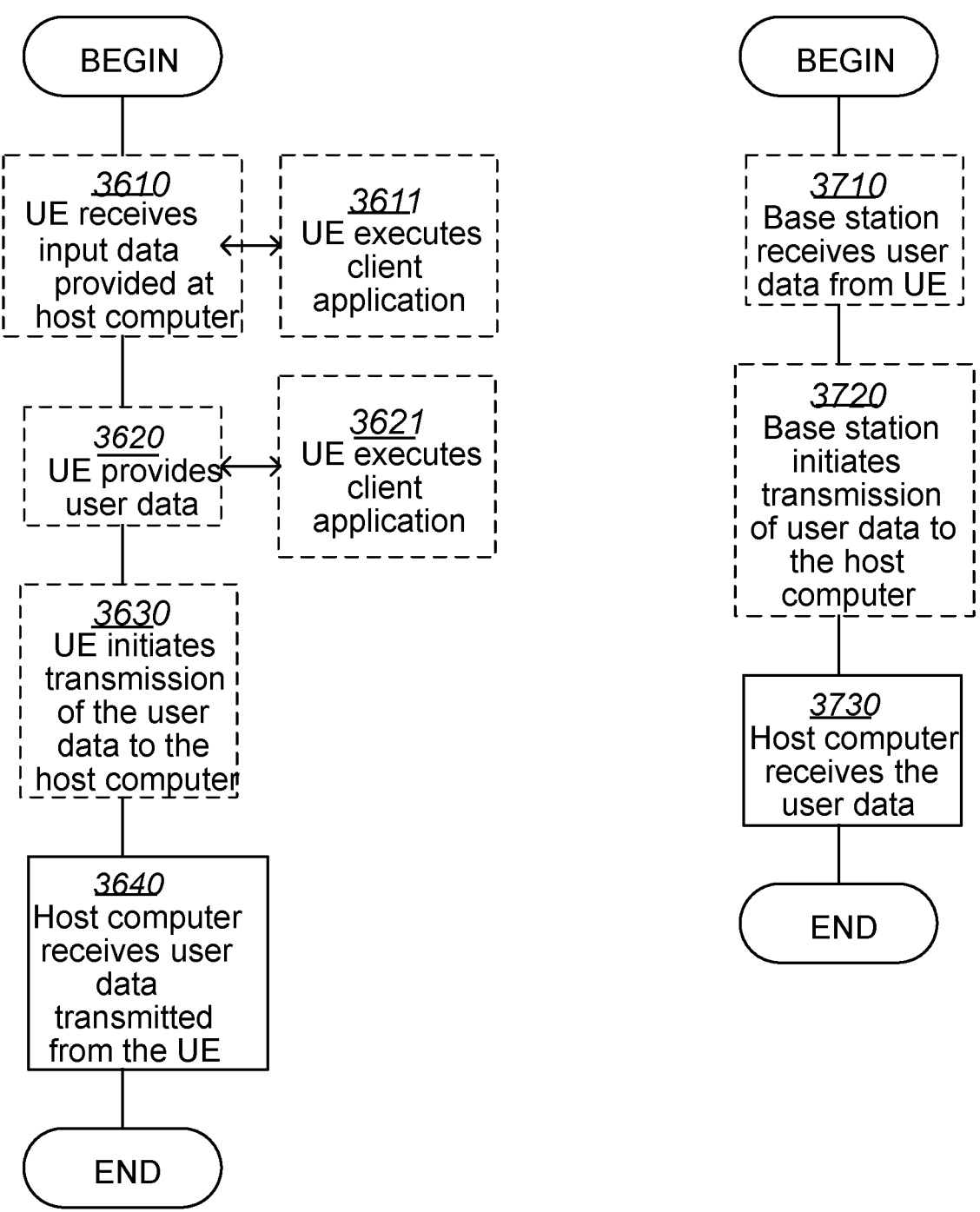

FIG. 13 is a flowchart illustrating a method implemented in a communication system, in accordance with one embodiment. The communication system includes a host computer, a base station such as a AP STA, and a UE such as a Non-AP STA which may be those described with reference to FIG. 9 and FIG. 10. For simplicity of the present disclosure, only drawing references to FIG. 13 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station such as a AP STA, and a UE such as a Non-AP STA which may be those described with reference to FIG. 9 and FIG. 10. For simplicity of the present disclosure, only drawing references to FIG. 14 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

The invention claimed is:

1. A method performed by a first network node for handling one or more Quality of Service (QoS) parameters for respective first and second radio resources to be provided to a User Equipment (UE) in Multi Radio access technology-Dual Connectivity, (MR-DC) which the first network node operates in the MR-DC with a second network node in a wireless communications network, the method comprising:

sending a first indication to the second network node, which first indication indicates a first set of alternative QoS levels and their respective one or more QoS parameters currently supported in the first network node;

enabling the second network node to decide one or more QoS parameters for the second radio resources to be provided to the UE from the second network node in the MR-DC, based on the first set of alternative QoS levels and their respective one or more QoS parameters currently supported in the first network node and a second set of alternative QoS levels and their respective one or more QoS parameters currently supported in the second network node;

receiving a second indication from the second network node, which second indication indicates the second set of alternative QoS levels and their respective one or more QoS parameters currently supported in the second network node;

deciding one or more QoS parameters for the first radio resources to be provided to the UE from the first network node in the MR-DC, based on the first set of alternative QoS levels and their respective one or more QoS parameters currently supported in the first network node and the second set of alternative QoS levels and their respective one or more second QoS parameters currently supported in the second network node; and providing the first radio resources to the UE in the MR-DC using the decided upon one or more QoS parameters.

2. The method of claim 1, further comprising:

establishing in the first network node, a current supported QoS, and its one or more QoS parameters, and the first set of alternative QoS levels and their respective one or more QoS parameters currently supported in the first network node; and wherein the first indication further indicates the established current QoS and its one or more QoS parameters, enabling the second network node to decide one or more QoS parameters for the second radio resources to be provided to the UE from the second network node in the MR-DC, further based on the established current QoS and its one or more QoS parameters.

3. The method of claim 1, wherein the second indication further indicates a current QoS and its one or more QoS parameters established in the second network node, and wherein deciding one or more QoS parameters for the first radio resources to be provided to the UE from the first network node in the MR-DC, further is based on the current QoS and its one or more QoS parameters established in the second network node.

4. The method of claim 1, wherein the one or more QoS parameters comprises one or more out of a Guaranteed Bit Rate (GBR), a Packet Delay Budget (PDB), and a Packet Error Rate (PER).

5. The method according to any of the claim 1, wherein: the first indication is sent to the second network node in an Xn dual connectivity message; and/or the second indication is received from the second network node in an Xn dual connectivity message.

6. The method of the claim 1, wherein:

the first network node is represented by any one out of a master node, or a secondary node; and the second network node is represented by any one out of a secondary node when the first network node is a master node, or a master node when the first network node is a secondary node.

7. A method performed by a second network node for handling one or more Quality of Service (QoS) parameters for respective first and second radio resources to be provided to a User Equipment (UE), in Multi Radio access technology-Dual Connectivity (MR-DC) which second network node operates in the MR-DC with a first network node in a wireless communications network, the method comprising:

receiving a first indication from the first network node, which first indication indicates a first set of alternative QoS levels and their respective one or more QoS parameters currently supported in the first network node;

sending a second indication to the first network node, which second indication indicates a second set of alternative QoS levels and their respective one or more QoS parameters currently supported in the second network node;

enabling the first network node to decide one or more QoS parameters for the first radio resources to be provided to the UE from the first network node in the MR-DC, based on the first set of alternative QoS levels and their respective one or more QoS parameters currently supported in the first network node and the second set of alternative QoS levels and their respective one or more QoS parameters currently supported in the second network node;

deciding one or more QoS parameters for the second radio resources to be provided to the UE from the second network node in the MR-DC, based on the first set of alternative QoS levels and their respective one or more QoS parameters currently supported in the first network node and the second set of alternative QoS levels and their respective one or more QoS parameters currently supported in the second network node; and providing the second radio resources to the UE in the MR-DC using the decided upon one or more QoS parameters.

8. The method of claim 7, further comprising:

establishing in the second network node, a current supported QoS, and its one or more QoS parameters, and the second set of alternative QoS levels and their respective one or more QoS parameters currently supported in the second network node; and wherein the second indication further indicates the established current QoS and its one or more QoS parameters, enabling the first network node to decide one or more QoS parameters for the first radio resources to be provided to the UE from the first network node in the MR-DC, further based on the established current QoS and its one or more QoS parameters.

9. The method of claim 7, wherein the first indication further indicates a current QoS and its one or more QoS parameters established in the first network node, and wherein deciding one or more QoS parameters for the second radio resources to be provided to the UE from the second network node in the MR-DC, further is based on the current QoS and its one or more QoS parameters established in the first network node.

10. The method of claim 7, wherein the one or more QoS parameters comprises one or more out of a Guaranteed Bit Rate (GBR), a Packet Delay Budget (PDB), and a Packet Error Rate (PER).

11. The method of claim 7, wherein any one or more out of:

the first indication is received from the first network node in an Xn dual connectivity message; and the second indication is sent to the first network node in an Xn dual connectivity message.

12. The method of claim 7, wherein:

the second network node is represented by any one out of a master node or a secondary node; and the first network node is represented by any one out of a secondary node when the second network node is a master node, or a master node when the second network node is a secondary node.

13. A first network node configured to handle one or more Quality of Service (QoS) parameters for respective first and second radio resources to be provided to a User Equipment (UE) in Multi Radio access technology-Dual Connectivity (MR-DC) which the first network node is operable in the MR-DC with a second network node in a wireless communications network, the first network node comprising:

processing circuitry; and memory containing instructions executable by the processing circuitry whereby the first network node is operative to:

send a first indication to the second network node, which first indication is adapted to indicate a first set of alternative QoS levels and their respective one or more QoS parameters currently supported in the first network node;

which first indication further is adapted to enable the second network node to decide one or more QoS parameters for the second radio resources to be provided to the UE from the second network node in the MR-DC, based on the first set of alternative QoS levels and their respective one or more QoS parameters currently supported in the first network node and a second set of alternative QoS levels and their respective one or more QoS parameters currently supported in the second network node;

receive a second indication from the second network node, which second indication is adapted to indicate the second set of alternative QoS levels and their respective one or more QoS parameters currently supported in the second network node;

decide one or more QoS parameters for the first radio resources to be provided to the UE from the first network node in the MR-DC, based on the first set of alternative QoS levels and their respective one or more QoS parameters currently supported in the first network node and the second set of alternative QoS levels and their respective one or more QoS parameters currently supported in the second network node; and providing the first radio resources to the UE in the MR-DC using the decided upon one or more QoS parameters.

14. The first network node of claim 13, further being configured to:

establish in the first network node, a current supported QoS, and its one or more QoS parameters, and the first set of alternative QoS levels and their respective one or more QoS parameters currently supported in the first network node; and wherein the first indication further is adapted to indicate the established current QoS and its one or more QoS parameters, enabling the second network node to decide one or more QoS parameters for the second radio resources to be provided to the UE from the second network node in the MR-DC, further based on the established current QoS and its one or more QoS parameters.

15. The first network node of claim 13, wherein:

the second indication is further adapted to indicate a current QoS and its one or more QoS parameters established in the second network node; and deciding the one or more QoS parameters for the first radio resources to be provided to the UE from the first network node in the MR-DC is further based on the current QoS and its one or more QoS parameters established in the second network node.

16. The first network node of claim 13, wherein the one or more QoS parameters are adapted to comprise one or more out of a Guaranteed Bit Rate (GBR), a Packet Delay Budget (PDB), and a Packet Error Rate (PER).

17. The first network node of claim 13, wherein:

the first indication is adapted to be sent to the second network node in an Xn dual connectivity message; and/or the second indication is adapted to be received from the second network node in an Xn dual connectivity message.

18. The first network of claim 13, wherein:

the first network node is represented by any one out of a master node or a secondary node; and the second network node is represented by any one out of a secondary node when the first network node is a master node, or a master node when the first network node is a secondary node.

19. A second network node configured to handle one or more Quality of Service (QoS) parameters for respective first and second radio resources to be provided to a User Equipment (UE), in Multi Radio access technology-Dual Connectivity (MR-DC), which second network node is operable in the MR-DC with a first network node in a wireless communications network, the second network node comprising:

processing circuitry; and memory containing instructions executable by the processing circuitry whereby the second network node is operative to:

receive a first indication from the first network node, which first indication is adapted to indicate a first set of alternative QoS levels and their respective one or more QoS parameters currently supported in the first network node;

send a second indication to the first network node, which second indication is adapted to indicate a second set of alternative QoS levels and their respective one or more QoS parameters currently supported in the second network node;

which second indication is further adapted to enable the first network node to decide one or more QoS parameters for the first radio resources to be provided to the UE from the first network node in the MR-DC, based on the first set of alternative QoS levels and their respective one or more QoS parameters currently supported in the first network node and the second set of alternative QoS levels and their respective one or more QoS parameters currently supported in the second network node;

decide one or more QoS parameters for the second radio resources to be provided to the UE from the second network node in the MR-DC, based on the first set of alternative QoS levels and their respective one or more QoS parameters currently supported in the first network node and the second set of alternative QoS levels and their respective one or more QoS parameters currently supported in the second network node; and provide the second radio resources to the UE in the MR-DC using the decided upon one or more QoS parameters.

20. The second network node of claim 19, further being configured to:

establish in the second network node, a current supported QoS, and its one or more QoS parameters, and the second set of alternative QoS levels and their respective one or more QoS parameters currently supported in the second network node; and wherein the second indication further is adapted to indicate the established current QoS and its one or more QoS parameters, enabling the first network node to decide one or more QoS parameters for the first radio resources to be provided to the UE from the first network node in the MR-DC, further based on the established current QoS and its one or more QoS parameters.

21. The second network node of claim 19, wherein:

the first indication further is adapted to indicate a current QoS and its one or more QoS parameters established in the first network node; and deciding the one or more QoS parameters for the second radio resources to be provided to the UE from the second network node in the MR-DC is further based on the current QoS and its one or more QoS parameters established in the first network node.

22. The second network node of claim 19, wherein the one or more QoS parameters comprises one or more out of a Guaranteed Bit Rate (GBR), a Packet Delay Budget (PDB), and a Packet Error Rate (PER).

23. The second network node of claim 19, wherein:

the first indication is adapted to be received from the first network node in an Xn dual connectivity message; and/or the second indication is adapted to be sent to the first network node in an Xn dual connectivity message.

24. The second network node of claim 19, wherein:

the second network node is represented by any one out of a master node or a secondary node; and the first network node is represented by any one out of a secondary node when the second network node is a master node or a master node when the second network node is a secondary node.

* * * * *